US011649389B2

(12) United States Patent
Gordon et al.

(10) Patent No.: US 11,649,389 B2
(45) Date of Patent: May 16, 2023

(54) COMPRESSIBLE CARBON PARTICLES TO MITIGATE ANNULAR PRESSURE BUILDUP USING COMPRESSIBLE PARTICLES

(71) Applicant: ExxonMobil Technology and Engineering Company, Spring, TX (US)

(72) Inventors: Peter A. Gordon, Yardley, PA (US); Thomas A. Petersen, Houston, TX (US); Spencer A. White, Houston, TX (US); Elizabeth L. Templeton-Barrett, Houston, TX (US); Christian Mayer, Flemington, NJ (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 30 days.

(21) Appl. No.: 17/221,155

(22) Filed: Apr. 2, 2021

(65) Prior Publication Data

US 2021/0309906 A1   Oct. 7, 2021

Related U.S. Application Data

(60) Provisional application No. 63/108,058, filed on Oct. 30, 2020, provisional application No. 63/006,605, filed on Apr. 7, 2020.

(51) Int. Cl.
*C09K 8/516* (2006.01)
*E21B 33/04* (2006.01)
(Continued)

(52) U.S. Cl.
CPC .............. *C09K 8/032* (2013.01); *C09K 8/516* (2013.01); *E21B 33/04* (2013.01); *E21B 33/14* (2013.01); *E21B 43/00* (2013.01)

(58) Field of Classification Search
CPC .......... E21B 33/04; E21B 33/14; E21B 43/00; C09K 8/516
See application file for complete search history.

(56) References Cited

U.S. PATENT DOCUMENTS

| 8,080,498 B2 * | 12/2011 | Shepherd | E21B 41/00 166/250.07 |
|---|---|---|---|
| 2007/0027036 A1 * | 2/2007 | Polizzotti | C09K 8/03 507/143 |

(Continued)

OTHER PUBLICATIONS

Kujong Jung, "Internal Burning of Petroleum Coke Particles in a Fluidized Bed", Fuel, Jun. 1987, pp. 774-778, vol. 66.

(Continued)

*Primary Examiner* — Catherine Loikith
(74) *Attorney, Agent, or Firm* — ExxonMobil Technology and Engineering Company—Law Department

(57) ABSTRACT

A collection of compressible particles. The compressible particles are intended to be used for attenuating pressure build-up within a confined volume such as a trapped annulus in a wellbore. Each of the compressible particles is fabricated to collapse in response to fluid pressure within the confined volume, and comprises carbon. Particularly, each of the particles comprises a plurality of peripheral openings, permitting an ingress of wellbore fluids in response to an increase in pressure within a trapped annulus. The collection of compressible particles together has a reversible volumetric expansion/contraction of ≥10% and up to 25% at pressures up to 10,000 psi. A method of attenuating annular pressure buildup within a wellbore using the collection of compressible particles is also provided.

26 Claims, 17 Drawing Sheets

(51) Int. Cl.
  *E21B 33/14*  (2006.01)
  *E21B 43/00*  (2006.01)
  *C09K 8/03*   (2006.01)

(56) References Cited

U.S. PATENT DOCUMENTS

| | | |
|---|---|---|
| 2020/0148932 A1 | 5/2020 | Narhi et al. |
| 2020/0148933 A1 | 5/2020 | Kibey et al. |
| 2020/0148936 A1 | 5/2020 | Narhi et al. |
| 2020/0148945 A1 | 5/2020 | Narhi et al. |
| 2020/0149374 A1 | 5/2020 | Narhi et al. |

OTHER PUBLICATIONS

Eric M. Suuberg et al., "Elastic Behaviour of Coals Studied by Mercury Porosimetry", Fuel, Jan. 13, 1995, pp. .1522-1530, vol. 74 No. 10.

\* cited by examiner

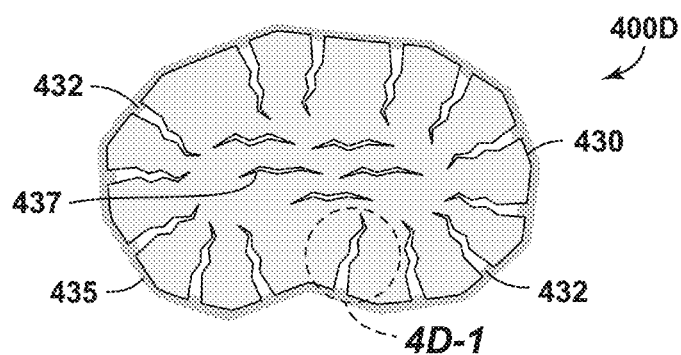 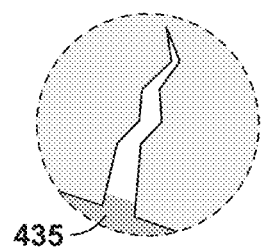
FIG. 4D  FIG. 4D-1
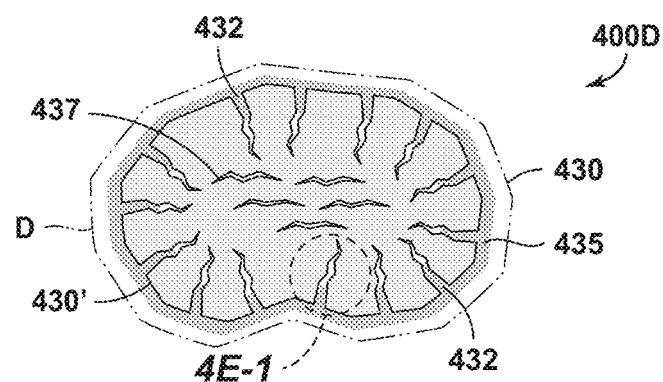 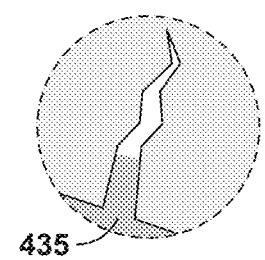
FIG. 4E  FIG. 4E-1

US 11,649,389 B2

COMPRESSIBLE CARBON PARTICLES TO MITIGATE ANNULAR PRESSURE BUILDUP USING COMPRESSIBLE PARTICLES

CROSS REFERENCE TO RELATED APPLICATIONS

This application claims the benefit of U.S. Provisional Application No. 63/006,605 filed Apr. 7, 2020 entitled "Compressible Carbon Particles to Mitigate Annular Pressure Buildup." This application also claims the benefit of U.S. Provisional Application No. 63/108,058 filed Oct. 30, 2020 entitled "Compressible Carbon Particles to Mitigate Annular Pressure Buildup." Each of these applications is incorporated herein by reference in its entirety.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present disclosure relates to the field of hydrocarbon recovery operations. More specifically, the present invention relates to the drilling and completion of wells. Further, the invention relates to the placement of compressible particles into a confined annular region within a wellbore in order to absorb pressure in response to thermal fluid expansion occurring during production.

TECHNOLOGY IN THE FIELD OF THE INVENTION

In the drilling of oil and gas wells, a wellbore is formed using a drill bit that is urged downwardly at a lower end of a drill string. The drill bit is rotated while force is applied through the drill string and against the rock face of the formation being drilled. After drilling to a predetermined depth, the drill string and bit are removed and the wellbore is lined with a string of casing.

In completing the wellbore, it is common for the drilling company to place a series of casing strings having progressively smaller outer diameters into the wellbore. A first string of casing is placed from the surface and down to a first drilled depth. This casing is known as surface casing. In the case of offshore operations, this casing may be referred to as a conductor pipe. One of the main functions of the initial string of casing is to isolate and protect the shallower, fresh water bearing aquifers from contamination by wellbore fluids. Accordingly, this casing string is almost always cemented entirely back to the surface.

One or more intermediate strings of casing is also run into the wellbore. Each successive pipe string extends to a greater depth than its predecessor, and has a smaller diameter than its predecessor. The process of drilling and then cementing progressively strings of casing is repeated several times until the well has reached total depth.

A final string of casing, referred to as production casing, is placed along the pay zones. In some instances, the final string of casing is a liner, that is, a pipe string that is hung in the wellbore using a liner hanger. Frequently today, the final string of casing is a long pipe string that extends along a horizontal portion (or "leg") of a wellbore.

In most completion jobs today, especially those involving so called unconventional formations where high-pressure hydraulic operations are conducted downhole, the surface casing and perhaps the first intermediate string of casing are entirely cemented up to the surface. Hydraulic cements, usually Portland cement, are used to cement the tubular bodies within the wellbore. However, in some completions, particularly those where overlapping strings of casing extend to the surface, the operator may choose to leave an extended portion of certain intermediate casing strings without cement. This saves the drilling company time and the well operator money. However, this also means that upon completion an extended section of wellbore will have fluids residing on top of a column of cement up to the well head.

FIG. 1A is a cross-sectional view of a wellbore 100 undergoing completion. The wellbore 100 defines a bore 10 that has been drilled from an earth surface 105 into a subsurface 110. The wellbore 100 is formed using any known drilling mechanism, but preferably using a land-based rig or an offshore drilling rig on a platform. For deeper horizontal wells such as the one shown in FIG. 1A, the wellbore may be formed at least in part through the use of a downhole motor and measurement-while-drilling ("MWD") electronics.

The wellbore 100 is completed with a first string of casing 120, sometimes referred to as surface casing. The wellbore 100 is further completed with a second string of casing 130, typically referred to as an intermediate casing. In deeper wells, that is wells completed below 7,500 feet, at least two intermediate strings of casing will typically be used. In FIG. 1A, a second intermediate string of casing is shown at 140.

The wellbore 100 is finally completed with a string of production casing 150. In the view of FIG. 1A, the production casing extends from the surface 105 down to a subsurface formation, or "pay zone" 115. The wellbore 100 is completed horizontally, meaning that a horizontal "leg" 50 is provided. The leg 50 includes a heel 153 and a toe 154 along the pay zone 115. In this instance, the toe 154 defines the end (or "TD") of the wellbore 100.

It is observed that an annular region 122 around the surface casing 120 is filled with cement 125. The cement (or cement matrix) 125 serves to isolate the wellbore from fresh water zones and potentially porous formations around the casing string 120 and near the surface 105.

The annular regions 132, 142 around the intermediate casing strings 130, 140 are also filled with cement 135, 145. Similarly, an annular region 152 around the production casing 150 is filled with cement 155. However, the cement 135, 145, 155 is only placed behind the respective casing strings 130, 140, 150 up to the lowest joint of the immediately surrounding casing string, or cement shoe. Thus, a non-cemented annular area is preserved above the cement matrix 135; a non-cemented annular area is preserved above the cement matrix 145; and a non-cemented annular area is preserved above the cement matrix 155.

FIG. 1B is an enlarged perspective view of the wellbore 100 of FIG. 1A, or at least the upper half of the wellbore 100. Here, casing strings 120, 130, 140 and 150 are again shown. In addition, cement matrices 125, 135, 145 and 155 are visible. Finally, non-cemented portions of annular areas 132, 142 and 152 are shown.

An annulus can be considered "trapped" if the cement pumping places the top of cement (or "TOC") higher than the previous shoe. Alternately, if the shoe remains open to the formation (not blocked by the cement) drilling mud particles or formation fines may settle out, effectively plugging up the bottom of the annulus. In any instance, those of ordinary skill in the art will understand that the non-cemented annular areas 132, 142, 152 are not unfilled above the TOC; rather, they are left with wellbore fluids at the end of completion. Such fluids may include drilling fluids, aqueous acid, and formation gas. When the well is completed, a wellhead (not shown) is placed over the annular areas 132, 142, 152, sealing these regions. For this reason each may be referred to as a "trapped annulus."

During the course of producing hydrocarbons, warm production fluids flow through a tubing string (shown at 160 in FIG. 5) up to the surface 105. These fluids raise the temperature inside the wellbore 100, including the fluids inside the one or more trapped annuli 132, 142, 152, causing thermal expansion. This, in turn, will increase the pressure within each trapped annulus. (Note that the effect of a trapped annulus is that the fluid in the annulus has no path to escape as the pressure rises.) This pressure can exceed the pressure ratings (burst or collapse pressures) of the inner strings of casing. For example, a trapped annulus can lead to pipe collapse and well failure.

Accordingly, a need exists for an improved wellbore design that can absorb burst pressure and mitigate thermal expansion within annular regions as wellbore temperature increases. Further, a need exists for packings of collapsible particles capable of absorbing an increase in fluid pressure within a trapped annulus along selected depths. A need further exists for a method of attenuating annular pressure build-up through the placement of compressible particles at selected depths within a trapped annulus, wherein each of the compressible particles has open pores spaces.

BRIEF SUMMARY OF THE DISCLOSURE

A collection of compressible particles is first provided. The compressible particles may be used for attenuating pressure within a confined volume, such as a trapped annulus within a wellbore. Each of the compressible particles is fabricated to collapse in response to fluid pressure within the annular region. More specifically, the compressible particles together absorb pressure changes arising from thermal expansion taking place during production from the wellbore.

Each of the compressible particles defines a body comprising carbon. It is preferred that the particles comprise calcined petroleum coke.

Each of the particles has a compressibility response of between 10% and 25%, up to 10,000 pounds per square inch ("psi") or when subjected to a change in hydrostatic fluid pressure between atmospheric pressure, 15 psi, and 10,000 psi. Stated another way, the particles strain between 10% and 25% when pressured from ambient pressure conditions up to 10,000 psi or when subjected to a change in hydrostatic fluid pressure between atmospheric pressure, 15 psi, and 10,000 psi. Note that for purposes of the present disclosure, the term "compressibility response" means a reversible volumetric expansion/contraction, that is measured in terms of percentages, that is, a percentage of particle volume contraction. This encompasses the idea of particle strain.

Ideally, the compressible particles have an average porosity of between 20% and 40%. In addition, each of the compressible particles has an outer diameter that is between 40 micrometer or microns (μm) and 1300 μm (in dry state) or between 100 micrometer or microns (μm) and 900 μm (in dry state). In one aspect, an average diameter of the compressible particles is between 350 μm and 450 μm.

Each of the particles comprises peripheral openings, permitting an ingress of wellbore fluids in response to an increase in pressure within the confined wellbore volume. Stated another way, each of the particles comprises pore spaces that are open to an outer surface of each particle, allowing fluid intrusion directly into the particles.

The compressible particles reside at one or more selected depths within the confined volume. In one instance, the compressible particles reside within a carrier fluid representing wellbore fluids, forming a fluid mixture. The wellbore fluids may comprise fresh water, brine, or any drilling fluid. More preferably, the particles are fixed along the outer diameter of a string of casing within the wellbore. In this instance, the particles are part of a packing of compressible materials.

Packings of compressible materials may be spaced apart separately along separate joints of casing within a trapped annulus. The length, number and spacing of packings may all be tuned to accommodate an expected upper range of pressure. The greater the number of packings used, or the longer the individual packings are, the greater the compressibility response of the packings within the wellbore.

A method of attenuating annular pressure build-up in a wellbore is also provided herein. In one aspect, the method first comprises running a first string of casing into a wellbore. The first string of casing extends into a subsurface to a first depth.

The method additionally includes running a second string of casing into the subsurface. The second string of casing extends to a depth that is greater than the first depth. Each string of casing is preferably hung from a wellhead using a liner hanger. The first string of casing surrounds an upper portion of the second string of casing forming an annular region.

The method further comprises providing one or more packings of compressible material. The packings of material are fixed at selected depths within the annular region. This may be done by attaching the packings of compressible material to the inner diameter of the first string of casing. More preferably, this is done by attaching the individual packings of compressible material to the outer diameter of the second string of casing.

The packings of compressible material may be secured to (i) an outer diameter of joints along the second string of casing before the second string of casing is run into the wellbore, or (ii) pup joints threadedly connected to the second string of casing, in series. In either instance, the compressible material is designed to absorb pressure in response to thermal expansion of wellbore fluids within the annular region. Thermal expansion occurs over time during the production of warm hydrocarbon fluids from the wellbore.

In one aspect, the packings of compressible material comprise carbon particles bound together within a matrix. More specifically, each of the one or more packings comprises a matrix of compressible particles, forming a sheet. The compressible particles are held together within the matrix by means of a binder. The binder may be, for example, rubber, hydrogenated nitrile butadiene rubber (HNBR), nitrile butadiene rubber (NBR), fluoroelastomer (such as FKM) or a soft plastic.

The sheet of each of the one or more packings is at least five feet in length, and preferably at least 20 feet in length. The sheet of each of the one or more packings is secured along an outer diameter of a pipe joint in series with a string of casing in the wellbore. In one aspect, the one or more packings comprise at least three packings, with the packings being spaced apart and dimensioned to accommodate an expected upper pressure within the wellbore.

In another aspect, each of the one or more packings of compressible material comprises: an elongated polymer sleeve placed along the outer diameter of the second string of casing; an upper collar securing the polymer sleeve to the second string of casing at an upper end of the polymer sleeve; a lower collar securing the polymer sleeve to the second string of casing at a lower end of the polymer sleeve; and a plurality of particles held within each sleeve, wherein the particles have a compressibility response (or a "reversible volumetric expansion/contraction") of greater than or equal to (≥) 10% as pressure increases from ambient conditions up to 10,000 psi or at pressures between 15 psi and at least 10,000 psi or when subjected to a hydrostatic fluid pressure between atmospheric pressure (15 psi) to 10,000 psi.

In another aspect, each of the one or more packings of compressible material comprises: an elongated porous filter secured along the outer diameter of the second string of casing, or threadedly placed in series with the second string of casing; and a plurality of compressible particles held within the filter.

The porous filter may be, for example, a rigid screen similar to a sand screen or a slotted liner. The filter may be between 5 feet and 25 feet in length.

The method additionally includes placing a column of cement around the second string of casing below the first depth. Then, a wellhead is placed over the wellbore, thereby forming a trapped annulus in the wellbore over the annular region. A fluid mixture resides within the trapped annulus around the packing of compressible material.

In connection with the method, each of the compressible particles comprises peripheral openings, permitting an ingress of wellbore fluids in response to an increase in pressure within the confined wellbore volume. In addition, each of the particles has an outer diameter that is between 40 μm and 1300 μm (in dry state) or between 100 μm and 900 μm (in dry state). Finally, each of the particles has a compressibility response of between 10% and 25%, up to 10,000 psi or at pressures between 15 psi and at least 10,000 psi or when subjected to a hydrostatic fluid pressure between atmospheric pressure (15 psi) to 10,000 psi.

It is again preferred that each of the compressible particles comprises carbon. However, other materials may be used, including a mixture of carbon and a polymer.

In connection with the method, the following additional steps may be taken: selecting a depth for the one or more packings of compressible material in the annulus; determining a range of pressures expected to be experienced by the fluid mixture in the trapped annulus; and determining a maximum pressure for effectiveness of the compressible particles.

The method may also further comprise: placing a string of production tubing into the wellbore within the second string of casing; producing hydrocarbon fluids from the wellbore; and in response to thermal expansion of the fluid mixture in the trapped annulus, absorbing increased pressure using the compressible particles.

Preferably, the one or more packings comprise at least three packings, with the packings being spaced apart and dimensioned to accommodate an expected upper pressure within the wellbore.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 3A presents the filter as a filter screen that is similar to a sand screen.

FIG. 3B presents the filter as a slotted tubular.

FIG. 4D is a cross-sectional view of a compressible particle in still another embodiment. Here, the particle represents a solid material having a plurality of peripheral openings. The particle is at ambient conditions.

FIG. 4D-1 is an exploded view of one of the outer openings in the compressible particle of FIG. 4D.

FIG. 4E is another cross-sectional view of the particle of FIG. 4D. Here, the particle is experiencing an elevated temperature and pressure, causing a reduction in volume in the particle.

FIG. 4E-1 is an exploded view of one of the outer openings in the compressible particle of FIG. 4E. It can be seen that wellbore fluids have encroached into the opening.

DETAILED DESCRIPTION OF CERTAIN EMBODIMENTS

Definitions

Figure 1A:
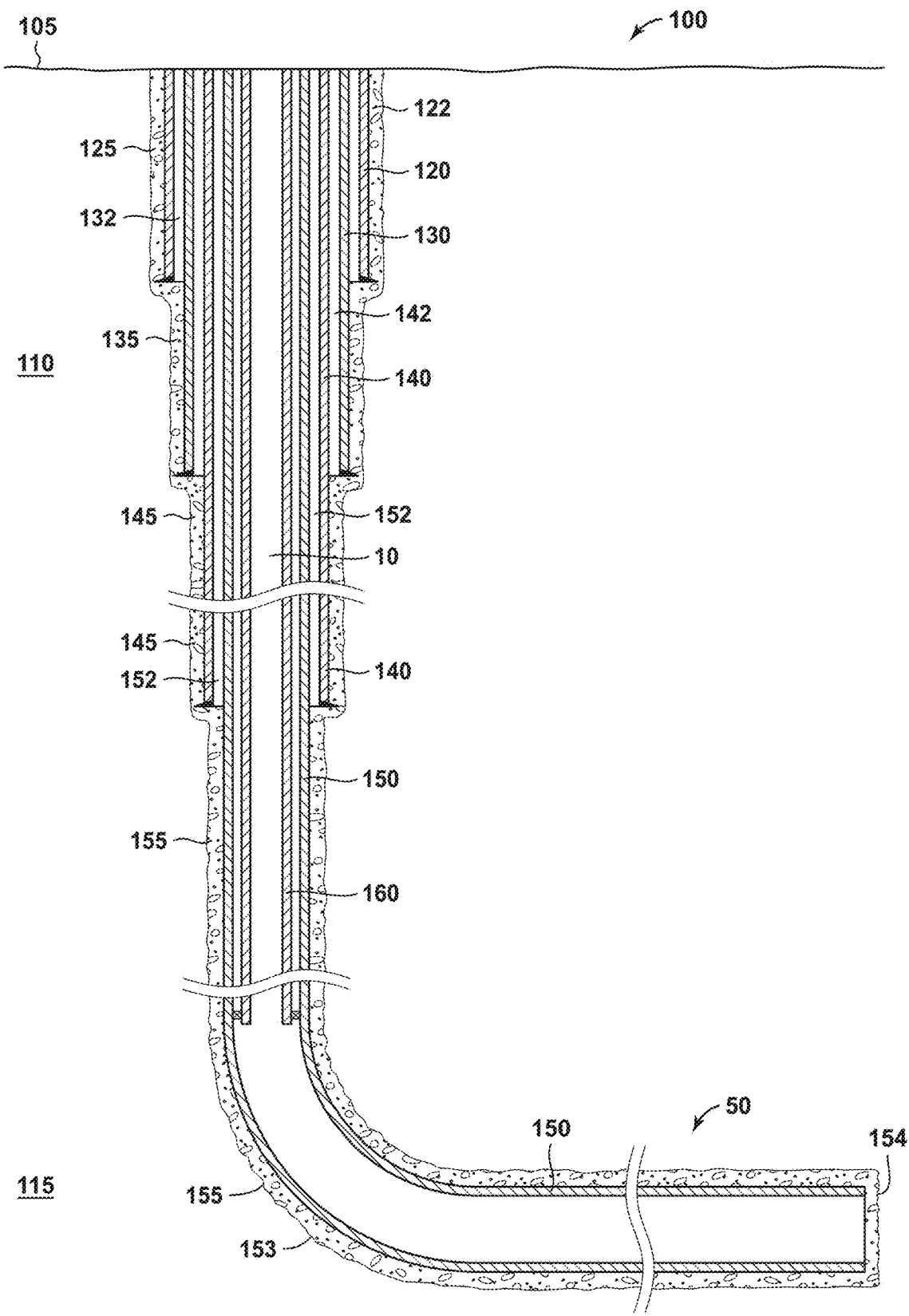
FIG. 1A is a side view of a wellbore. The wellbore has a plurality of casing strings cemented into place, and is completed with a string of production casing.

For purposes of the present application, it will be understood that the term "hydrocarbon" refers to an organic compound that includes primarily, if not exclusively, the elements hydrogen and carbon. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions or at surface conditions. Hydrocarbon fluids may include, for example, oil, natural gas, coalbed methane, shale oil, pyrolysis oil, pyrolysis gas, a pyrolysis product of coal, and other hydrocarbons that are in a gaseous or liquid state, or combination thereof.

As used herein, the terms "produced fluids," "reservoir fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, oil, natural gas, pyrolyzed shale oil, synthesis gas, a pyrolysis product of coal, oxygen, carbon dioxide, hydrogen sulfide and water.

As used herein, the term "fluid" refers to gases, liquids, and combinations of gases and liquids, as well as to combinations of gases and solids, combinations of liquids and solids, and combinations of gases, liquids, and solids.

As used herein, the term "wellbore fluids" means water, hydrocarbon fluids, formation fluids, or any other fluids that may be within a wellbore during a production operation. Wellbore fluids may include a weighting agent that is residual from drilling mud.

As used herein, the term "gas" refers to a fluid that is in its vapor phase. A gas may be referred to herein as a "compressible fluid." In contrast, a fluid that is in its liquid phase is an "incompressible fluid."

As used herein, the term "subsurface" refers to geologic strata occurring below the earth's surface.

As used herein, the term "formation" refers to any definable subsurface region regardless of size. The formation may contain one or more hydrocarbon-containing layers, one or more non-hydrocarbon containing layers, an overburden, and/or an underburden of any geologic formation. A formation can refer to a single set of related geologic strata of a specific rock type, or to a set of geologic strata of different rock types that contribute to or are encountered in, for example, without limitation, (i) the creation, generation and/or entrapment of hydrocarbons or minerals, and (ii) the execution of processes used to extract hydrocarbons or minerals from the subsurface.

As used herein, the term "wellbore" refers to a hole in the subsurface made by drilling or insertion of a conduit into the subsurface. A wellbore may have a substantially circular cross section. The term "well," when referring to an opening in the formation, may be used interchangeably with the term "wellbore."

Description of Selected Specific Embodiments

Figure 1B:
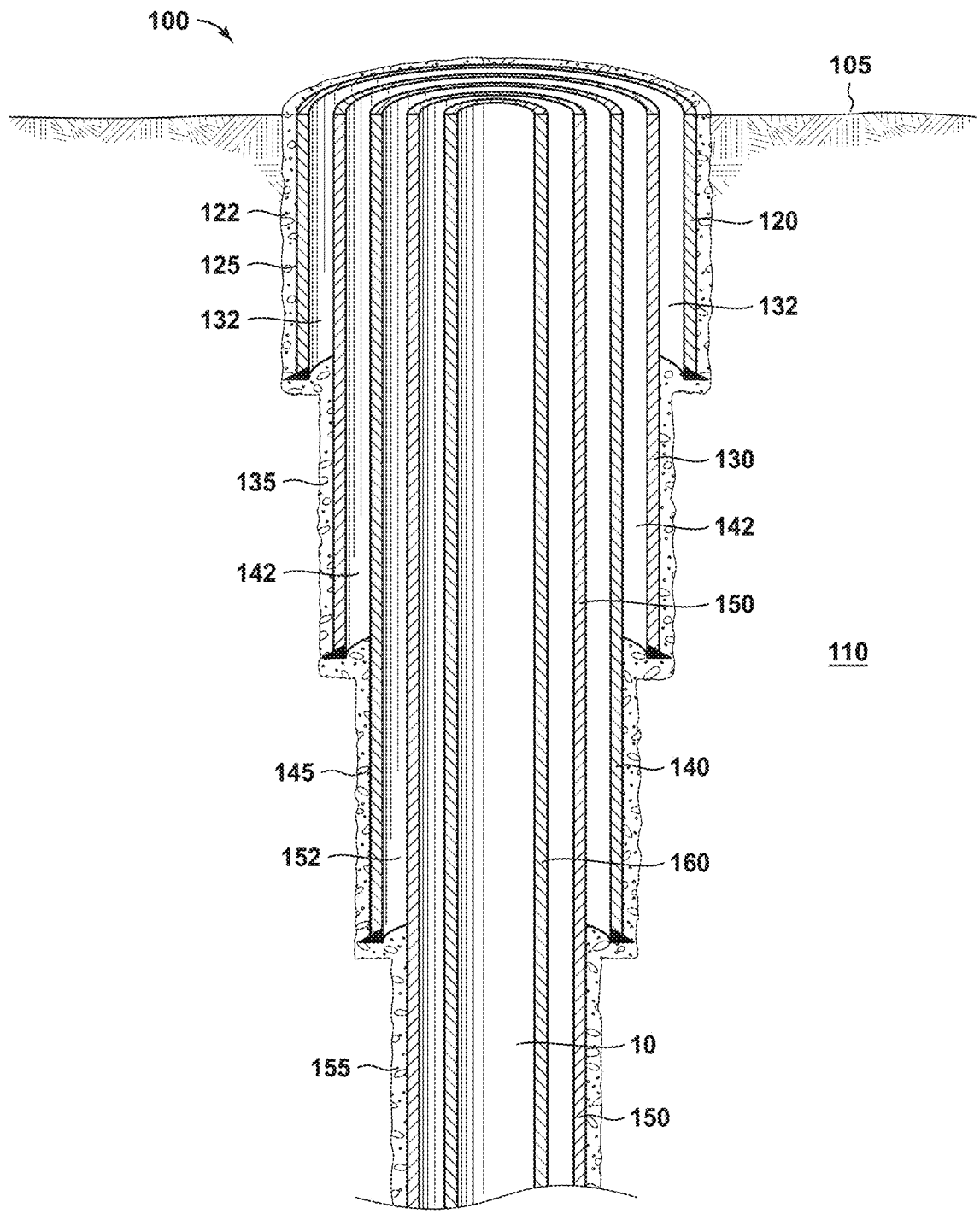
FIG. 1B is a side perspective view of an upper half of the wellbore of FIG. 1A. Three annular regions are shown as trapped annuli.
Figure 2A:
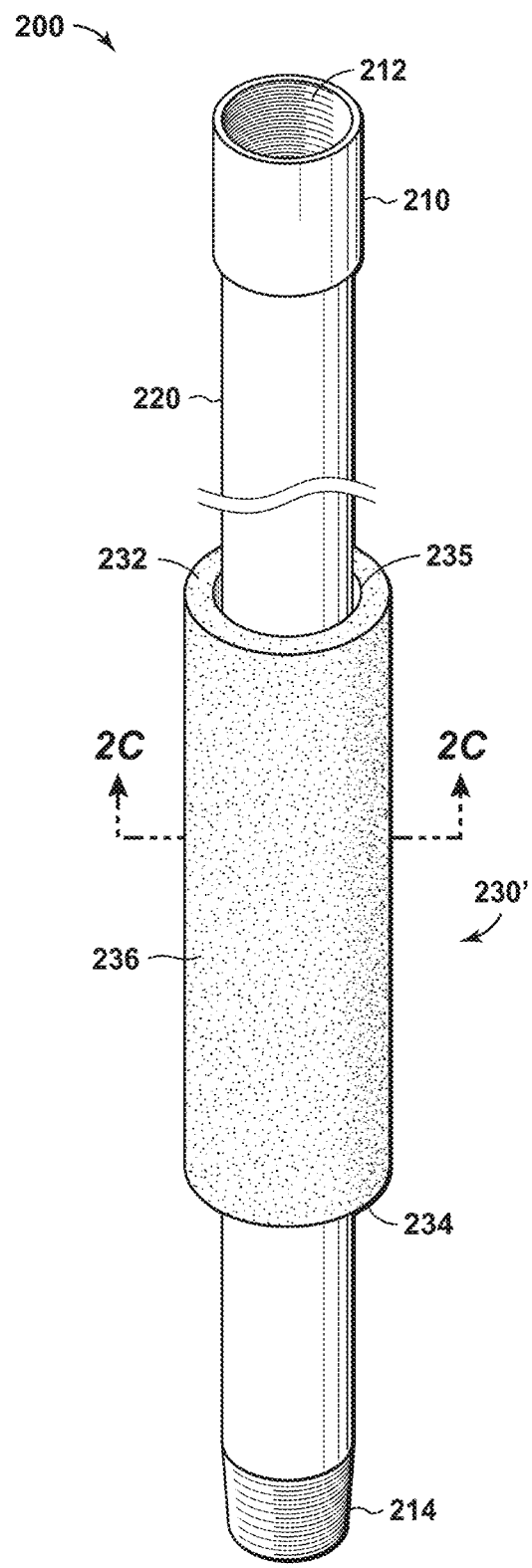
FIG. 2A is a perspective view of a tubular body (or joint of casing). A packing comprising a matrix of compressible particles is shown frictionally or adhesively engaging the casing. The matrix forms a sheet that can be wrapped around the pipe body.

FIG. 2A is a perspective view of a tubular body 200 of the present invention, in one embodiment. In a preferred aspect, the tubular body 200 is deployed in a wellbore as part of a string of casing. Stated another way, the tubular body 200 may be threadedly placed in series with a string of casing (such as casing string 140 of FIG. 1B).

The tubular body 200 is specifically designed to reside along an open annular region such as region 142. The tubular body 200 may be of a standard length for a pipe joint, such as 30 feet, 32 feet or even 40 feet.

The tubular body 200 comprises an upper end 210 and a lower end 214. In the vernacular of the industry, the upper end 210 is the box end while the lower end 214 is the pin end. The box end 210 comprises internal threads 212 that are configured to threadedly connect with the pin end of an immediately upper joint of pipe (not shown). Reciprocally, the pin end 214 is configured to "stab" into the box end of an immediately lower joint of pipe (not shown) for threaded connection.

The tubular body 200 defines an elongated wall forming a pipe 220 (or elongated pipe body). The pipe 220 may be fabricated from any steel material having burst and collapse pressure ratings suitable for a wellbore environment. Those of ordinary skill in the art will understand that with the advent of hydraulic fracturing, burst ratings of pipe (and particularly of production casing) are much higher than in older wells and may withstand pressures of up to 15,000 psi. As an alternative, the pipe body 220 may be fabricated from ceramic.

Placed along the outer diameter of the pipe 220 is a packing 230'. The packing 230' defines a matrix of compressible material 236. Specifically, a plurality of carbon particles are held together by a matrix of cross-linked binder, forming a sheet.

In the arrangement of FIG. 2A, the sheet of compressible particles 236 has been wrapped around the pipe body 220, forming an elongated cylindrical body. The packing 230' has an upper end 232 and a lower end 234. Preferably, the packing 230' is at least five feet in length.

In one aspect, a foam or rubber composite houses the compressible particles by impregnating them into a cross-linked polymer matrix. Preferably, the particles are just blended with a binder to form a solid sheet. The binder may be, for example, silicone, nitrile butadiene rubber (NBR), fluoroelastomer (such as FKM) or hydrogenated nitrile butadiene rubber (HNBR), providing a compressible solid filler. Alternatively, a thermoset or thermoplastic (or soft plastic) material is used as the binder. The sheet is inert to the heated wellbore fluids.

Compared to the carbon particles, the polymer is soft and compressible allowing it to effectively transmit stress onto the carbon particles collectively. This allows the porous matrix of the carbon particles to compress, providing additional volume for the fluid, surrounding the carbon-polymer composite in the annulus, to move into as it thermally expands or is otherwise strained.

The packing 230' may be formed as a thick, mechanically robust sheet of material. The packing 230' may be, for example, one to three centimeters in thickness. In one aspect, the compressible particles comprise an electro-thermally treated calcined petroleum coke. The coke may have small pores that are closed to fluid ingress, which allows them to compress when the fluid pressure surrounding the particles is increased. The particles are durable under repeated, cyclic loading and sustained loading at high pressure, providing reversible compressibility to fluid.

In a preferred embodiment, the particles making up the compressible material 236 define a carbonaceous particulate with an amorphous shape. The particles 236 are characterized by having a reversible volumetric expansion/contraction of greater than or equal to ($\geq$) 3% at 5,000 psi or at pressures between 15 psi and at least 5,000 psi or when subjected to a hydrostatic fluid pressure between atmospheric pressure (15 psi) to 5,000 psi. Alternatively, the particles 236 are characterized by having a reversible volumetric expansion/contraction of greater than or equal to ($\geq$) 3% at 10,000 psi or at pressures between 15 psi and at least 10,000 psi or when subjected to a hydrostatic fluid pressure between atmospheric pressure (15 psi) to 10,000 psi. This means when starting at ambient pressure (15 psi) and increasing the pressure to 10,000 psi, the volume strain measures as follows:

$$-\left(\frac{\Delta V}{V_0}\right) \geq 0.03,$$

where: $V_0$=the initial volume of the particles and their dry pore space at ambient pressure (15 psi); and
$\Delta V$=the volume afforded the fluid due to skeletal compression and pore collapse, and specifically, the change in particle volume between a reference ambient pressure and when the particles are subjected to a fluid pressure of 10,000 psi.

In another aspect, the particles have a compressibility response of 10% to 25% for pressures between 15 psi and 10,000 psi, as:

$$-\left(\frac{\Delta V}{V_0}\right) \times 100\% \geq 10\%,$$

where: $\Delta V = V_f - V_0$
$V_0$=the initial volume of the particles and their dry pore space;
$V_f$=the final volume of the particles and their dry pore space; and
$\Delta V$=the volume afforded the surrounding fluid due to skeletal compression and pore collapse, and specifically, the change in particle volume between a reference ambient pressure and when the particles are subjected to a fluid pressure of up to 10,000 psi (or at pressures between 15 psi and at least 10,000 psi or when subjected to a hydrostatic fluid pressure between atmospheric pressure (15 psi) to 10,000 psi).

Note that pressure is also being mitigated via the additional volume that is afforded the fluid as fluid invades into open pore spaces. Ideally, the compressibility of the particles is highest at the pressures the carbon particles may experience downhole.

The particles 236 may behave similar to those described in U.S. Pat. No. 9,458,703 issued to Superior Graphite Co., of Chicago, Ill. The '703 patent is incorporated herein by reference in its entirety. However, in accordance with the present disclosure pressure mitigation takes place largely from an intrusion of fluid into the peripheral openings (shown at 432 in FIG. 4E-1) and not just by a collapse of closed pores (shown at 415 in FIG. 4C).

Figure 2B:
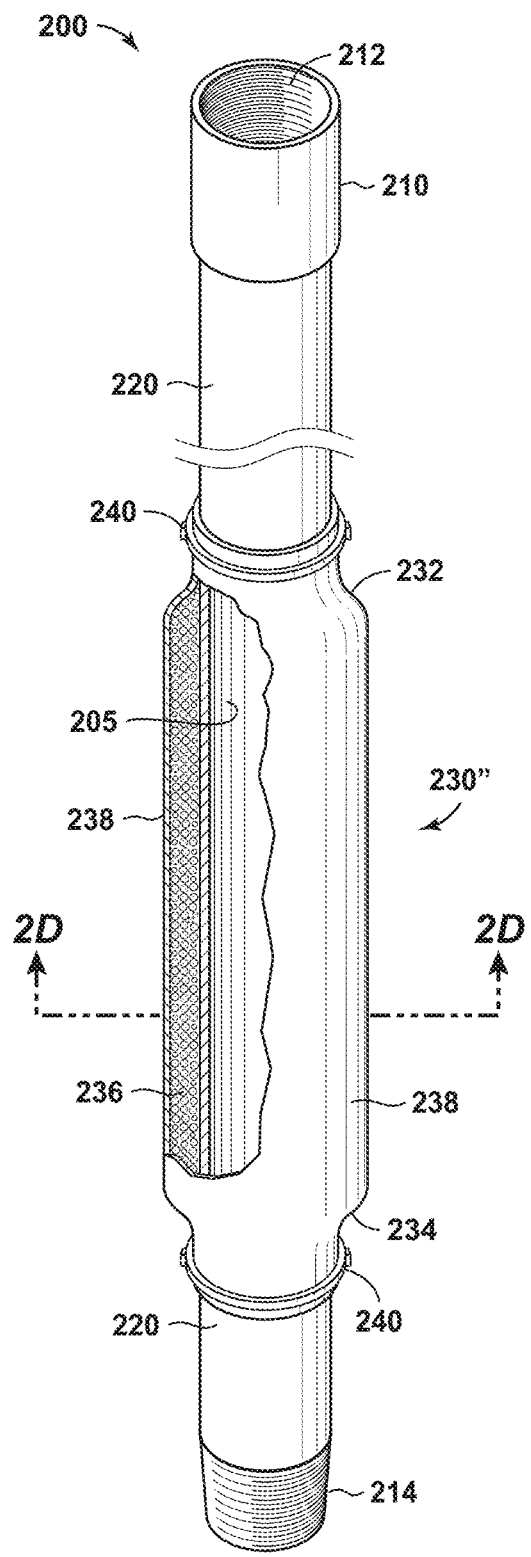
FIG. 2B is a perspective, cut-away view of a packing of compressible materials in a second embodiment. Here, a polymeric sleeve has been placed around compressible particles and secured to the outer diameter of a pipe body.
Figure 2C:
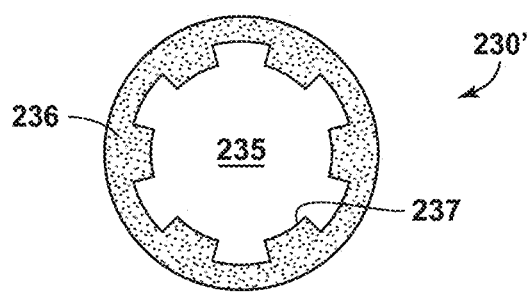
FIG. 2C is a cross-sectional view of the packing of FIG. 2A, taken across Line 2C-2C.

FIG. 2C is a cross-sectional view of the packing 230' of FIG. 2A, taken across Line 2C-2C. In this view, it can be seen that the packing 230' has a generally cylindrical profile. A central opening 235 is provided in the packing 230'. The central opening 235 is dimensioned to closely or frictionally receive the pipe 220. To facilitate a frictional engagement, a series of equi-radially spaced spokes 237 is provided, extending inward to the opening 235. The frictional engagement is sufficiently tight to ensure a mechanical connection that may not slide along the tubular body 200.

In one embodiment, the compressible particles 236 are adhered to the outer surface of the pipe 220. This may be done by using the same cross-linking polymer that secures the compressible particles themselves together. A durable polymer matrix is formed that is structurally robust so as to endure the abrasion encountered when running the casing and to not permit slippage of the particles 236 from the pipe 220. Specifically, a plurality of carbon particles are held together in a binder such as rubber, hydrogenated nitrile butadiene rubber (HNBR), nitrile butadiene rubber (NBR), fluoroelastomer (such as FKM) or a soft plastic.

It is preferred that the matrix be cylindrical as depicted in FIGS. 2A and 2C. However, in another aspect the matrix is in the form of elongated rods that are adhesively secured to the outer diameter of the pipe body 220.

As an alternative to a packing in the form of a sheet, a packing may take the form of a sleeve that encapsulates the compressible particles 236. FIG. 2B is a perspective, cut-away view of a packing 230" in an alternate embodiment. Here, the packing 230" defines an elongated, elastomeric sleeve 238 that holds the compressible particles 236 in place.

In FIG. 2B, the particles 236 are again fitted onto an elongated pipe joint 220. An inner bore 205 of the pipe 220 can be seen. However, in this embodiment the particles 236 are wrapped in an annular sleeve 238, forming a packing of compressible materials 230" in a second embodiment. Sufficient clearance around the sleeve 238 is provided to enable the circulation of drilling fluids up the annulus during completion.

Figure 2D:
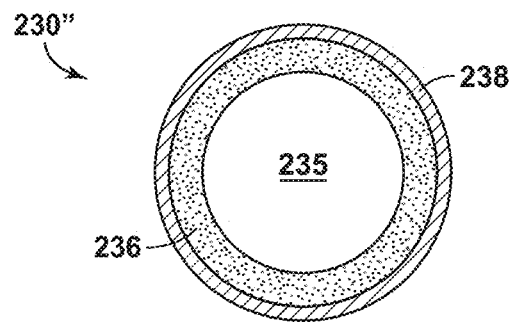
FIG. 2D is a cross-sectional view of the packing of FIG. 2B, taken across Line 2D-2D.

FIG. 2D is a cross-sectional view of the packing 230" of FIG. 2B, taken across Line 2D-2D. Here, the optional spokes 237 are omitted; however, it is understood that the spokes 237 of FIG. 2C may still be employed. More preferably, the packing 230" is secured to the outer diameter of the pipe body 220 by means of clamps 240 around the top 232 and bottom 234 ends.

The sleeve 238 may be fabricated from a relatively stiff polymeric material. Suitable polymeric materials may include neoprene, polyurethane rubber, vinyl, nitrile rubber, butyl rubber, silicone rubber, or combinations thereof. Alternatively or in addition, the sleeve 238 may be held in a taut position by means of the opposing clamps 240. Of course, when securing the clamps 240 onto the outer diameter of the pipe body 220 care must be taken not to compromise the integrity of the joint 200 as a pressure vessel by scoring the pipe 220. Alternatively, the sleeve 238 may be secured to the outer diameter of the pipe body 220 by a suitable, high-temperature tolerant adhesive.

It is preferred that the polymeric material of the sleeve 238 not expand substantially upon being heated during production. If there is expansion, such should be primarily due to ingress of fluid into the pore spaces between polymer chains that increase in volume upon increasing the temperature. Thus, the volume change of the bulk expansion of the polymeric sleeve 238 is compensated by a similar increase in volume within its fluid-accessible pore space. Optionally, the sleeve 238 may have one or more openings allowing an ingress of wellbore fluids.

In either instance, as wellbore fluids within the annular region expand, pressure may be applied against the outer surface of the sleeve 238. In this way, the sleeve 238 has a degree of compliance. Where no through-openings are provided, the sleeve 238 then transmits that pressure against the compressible particles 236 within the sleeve 238. Pressure that is built up in the annulus 142 is absorbed by the particles 236.

FIG. 2D is a cross-sectional view of the packing 230" of FIG. 2B, taken across Line 2D-2D. Here, the optional spokes 237 are omitted; however, it is understood that the spokes 237 of FIG. 2C may still be employed. More preferably, the packing 230" is secured to the outer diameter of the pipe body 220 by means of clamps 240 around the top 232 and bottom 234 ends.

Figure 2E:
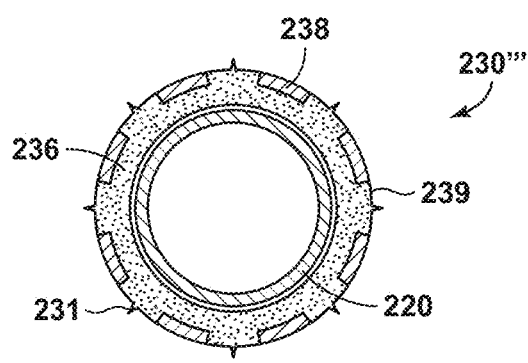
FIG. 2E is a cross-sectional view of the packing of FIG. 2B, in an alternate embodiment.

FIG. 2E is a cross-sectional view of the packing of FIG. 2B, in an alternate embodiment 230'''. Here, the compressible particles 236 are formed to have a star-shaped profile. Outward-facing spokes 239 are shown equi-distantly spaced about the compressible particles 236. The elastomeric sleeve 238 fits snuggly between outward spokes 239 of the particles 236. Optional tips 231 extending out from the spokes 239 help centralize the packing 230" within the annular region 142.

It is noted that in FIG. 2E, the pipe body 220 is also shown in cross-section. This is for illustrative purposes.

In either FIG. 2D or 2E, the outer sleeve 238 of the packing 230 is designed to hold a cylindrical shape around the matrix of particles 236 until a designated annular pressure is reached. Typically, compression may not begin to occur until a pressure of at least 4,000 psi is felt. Once the designated annular pressure is reached, the sleeve 238 may begin to collapse. As annular pressure continues to increase, pressure is transmitted to the matrix of particles 236, thereby absorbing pressure within the annular region 142 and reducing the likelihood of the pipe 220 collapsing during production operations.

In an alternate embodiment, the packing uses a more rigid outer medium, particularly a filter screen. In this embodiment, the particles need not be bound together into a cross-linked polymer matrix as in FIG. 2A or 2B; instead, the particles 236 are tightly held in place along the tubular body 200 by mechanically affixing a porous screen to the outer diameter of the pipe 220.

Figure 3A:
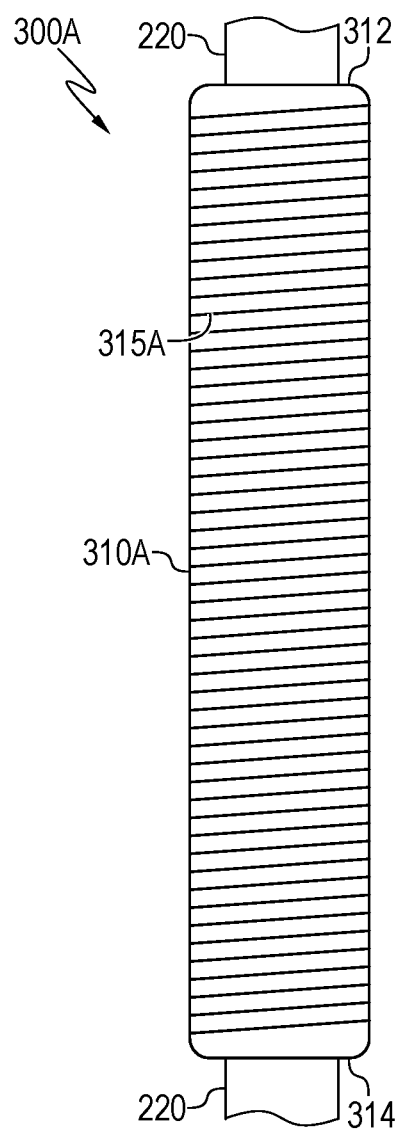
FIGS. 3A and 3B present side views of packings of compressible particles in alternate embodiments. Instead of using a compliant, polymeric sleeve, a rigid but porous filter is provided around the particles.
Figure 3B:
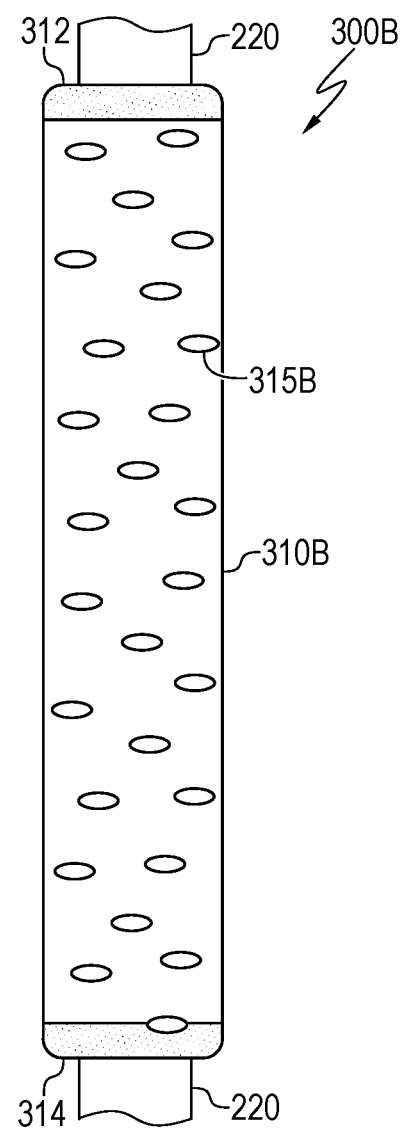

FIGS. 3A and 3B present alternate embodiments of suitable annular filter screens as packings. FIG. 3A presents the screen as a wound filter screen 300A. The filter screen 300A is similar to a known sand screen. The filter screen 300A may be fabricated from either steel (or any corrosion-resistant alloy) or ceramic. Preferably, the filter screen 300A is fabricated from metal wire 310A that is wound around and supported by elongated vertical ribs (not visible). Micro-slots 315A are preserved between the wire 310A to enable pressure communication into the containment area.

FIG. 3B presents the filter screen 300B as a slotted tubular body. The filter screen 300B defines a metal tubular body 310B with a plurality of dedicated slots 315B. The slots 315B again enable pressure communication into the containment area.

Each filter screen has an upper end 312 and a lower end 314. The filter screens 300A or 300B are designed to be fitted around an outer diameter of the pipe 220 and filled with compressible particles. Each filter screen 300A or 300B may present slots 315A, 315B that permit fluid and pressure communication between the wellbore and the compressible particles. The gap size of the slots 315A, 315B in the screens 300A, 300B may range in size from 10 micrometers or microns ($\mu m$) to 100 $\mu m$, depending on the specific particle size distribution. At the same time, the particle size distribution may be between 100 $\mu m$ and 900 $\mu m$ (dry).

The preferred median diameter for the compressible carbon is 400 microns. In one aspect, about 10% of the particles have a diameter that is over 700 microns, or over 800 microns. It is understood that the gaps 315A, 315B must be smaller than the smallest of the diameters of the compressible particles.

In the arrangements of FIGS. 3A and 3B, the screens 300A, 300B are considered to be rigid. This protects the integrity of the compressible particles residing within an area of containment within the screens 300A, 300B and around the pipe body 220. The outer diameters of the screens 300A, 300B are dimensioned such that an annular space is preserved that permits drilling fluids to pass within the inner diameter of a surrounding casing string during completion.

Figure 4A:
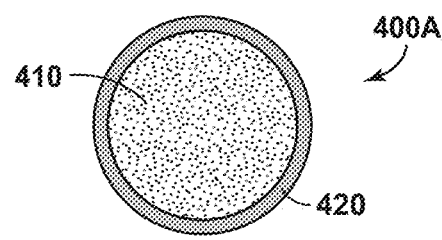
FIG. 4A is a cross-sectional view of a compressible particle that may be placed in the filters of FIGS. 3A and 3B, in one embodiment. Here, the compressible particle has a spherical core residing within a shell.

FIG. 4A provides a cross-sectional view of a compressible particle 400A as may be used in the annular filter screens 300A, 300B. The compressible particle 400A has a spherical core 410. The core 410 is fabricated from a carbon material. The spherical core 410 is encapsulated within a shell 420. The shell 420 may be either an elastomeric material or a foam material.

The core 410 may comprise a petroleum coke that is heat treated. In another aspect, the core material comprises graphene, representing carbon material placed in layers. Graphene particles are shown to provide low-density, high compressibility and high elasticity. In addition, graphene particles can have resistance to fatigue. In one aspect, a carbon-graphene composite compound of arched structures arranged into parallel stacks is used.

Figure 4B:
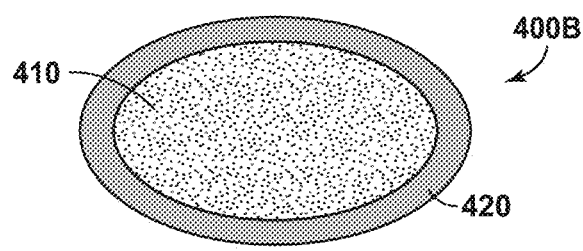
FIG. 4B presents a cross-sectional view of a compressible particle in an alternate embodiment. Here, the core and surrounding shell have an oval profile.

In the arrangement of FIG. 4A, the compressible particle 400A is spherical in shape. However, the particle may alternatively be more ovoid in shape. FIG. 4B presents a cross-sectional view of a compressible particle 400B in an alternative arrangement. Here, the core 410 and surrounding shell 420 have an oval profile.

Figure 4C:
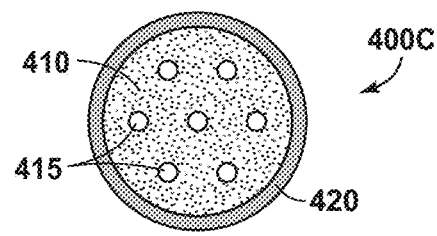
FIG. 4C presents yet another cross-sectional view of a compressible particle. Here, the core contains a plurality of small holes to enhance porosity and compressibility.

FIG. 4C presents yet another cross-sectional view of a compressible particle 400C. Here, the core 410 contains a plurality of small holes 415. The holes 415 enhance porosity and compressibility. Further, increasing the number of holes 415 increases porosity and compressibility response.

FIG. 4D presents another cross-sectional view of another compressible particle 400D. Here, the particle 400D represents a solid carbon particle having an amorphous shape. A periphery of the amorphous particle 400D is shown at 430.

Preferably, the particle 400D comprises a petroleum coke that is heat treated, forming a compressive carbon. The starting material is commercially known as "Calcined Petroleum Coke-Medium High Sulfur." In some designs the maximum sulfur content of the starting material may be as high as 8%. The starting material is heat-treated in a fluidized bed furnace, such as that shown and described in U.S. Pat. No. 4,160,813, incorporated herein by reference. The resultant material comprises a carbonaceous particulate material having a substantially reduced sulfur content, and that has a reversible volumetric expansion/contraction in a fluid media of greater than or equal to ($\geq$) 3% for pressures between 15 psi and up to 5,000 psi (34.5 MegaPascal (MPa)), and greater than or equal to ($\geq$) 10% for pressures between 15 psi and up to 10,000 psi (68.9 MPa) (or at pressures between 15 psi and at least 10,000 psi or when subjected to a hydrostatic fluid pressure between atmospheric pressure (15 psi) to 10,000 psi). The material can be repeatedly subjected to pressures between 4,000 psi and 10,000 psi and "rebound" to its original volume.

The low cost and ease of processing petroleum coke and coal waste make the use of carbon ideal to use as a raw input material. Petroleum coke products calcined to varying degrees may be used. Such products possess a low thermal coefficient of expansion while providing high compressibility. Such materials are available from Superior Graphite Co. of Chicago Ill.

Beneficially, a plurality of peripheral openings 432 reside around the outer surface of the particle 400D. In addition, intragranular pores 437 are present. The openings 432 and the pores 437 provide for a porous carbon particle. The peripheral openings 432 along the periphery 430 are capable of receiving an ingress of wellbore fluids 435.

In the view of FIG. 4D, the particle 400D is experiencing what would be considered to be a usual pressure within the annular region of a wellbore. The pressure is governed primarily by the hydrostatic head of fluid residing within the annular region. One might refer to this as the ambient pressure. Wellbore fluids 435 remain largely external to the particle 400D.

FIG. 4D-1 is an exploded view of one of the peripheral openings 432 in the compressible particle 400D of FIG. 4D. It can be seen that wellbore fluids have not significantly invaded the peripheral opening 432.

In FIG. 4E, the same particle 400D is undergoing increased pressure due to thermal expansion of wellbore fluids 435. It can be seen that the peripheral openings 432 are beginning to close even while wellbore fluids 435 encroach into the particle 400D. Fluid intrusion is generally resisted by capillary stress, but overcomes the stress as pressure increases within the wellbore. In addition, a collapse of the intragranular pores 437 is taking place.

Dashed line "D" shows the reference particle shape. This is the original shape of particle 400D in FIG. 4D at ambient pressure. It can be seen that the overall size of the carbon skeleton has reduced from line "D" in response to compressive forces caused by geothermal expansion of wellbore fluids. The compressed particle "frees up" between 5% and 25% of its reference volume "D". The new periphery of the particle 400D is at 430'.

FIG. 4E-1 is an exploded view of one of the peripheral openings 432 in the compressible particle of FIG. 4E. It can be seen that wellbore fluids have encroached into the peripheral opening 432.

In one aspect, the carbon material comprises mesocarbon micro-beads or graphite carbons. Alternatively, a composite of polymer and petroleum coke may be formed into beads. For example, a co-polymer of methylmethacrylate and acrylonitrile may be used with graphite. In another embodiment, a terpolymer of methylmethacrylate, acrylonitrile and dichloroethane is used. The dichloroethane may be a vinylidene dichloride. Preferably, the beads are not infused with gas so as to limit expansion of the bead material upon exposure to heat during wellbore operations.

Other polymeric materials may be used such as neoprene, polyurethane rubber, vinyl, nitrile rubber, butyl rubber, ethylene propylene diene monomer rubber (or EPDM synthetic rubber), silicone rubber, hydrogenated nitrile butadiene rubber (HNBR), nitrile butadiene rubber (NBR), and fluoroelastomer (FKM). or combinations thereof. The material may be continuous or it may be porous, having a porosity of 20% to 40%.

Preferably, the particles may have a compressibility response of between 10% and 25% at pressures between 15 psi and at least 10,000 psi or when subjected to a hydrostatic fluid pressure between atmospheric pressure (15 psi) to 10,000 psi). More preferably, the particles may have a compressibility response in a fluid media of between 14% and 22% (up to 10,000 psi or at pressures between 15 psi and at least 10,000 psi or when subjected to a hydrostatic fluid pressure between atmospheric pressure (15 psi) to 10,000 psi)).

Preferably, each of the particles has a resiliency of between 80% and 120%. More preferably, each of the particles has a resiliency of between 87% and 117%.

In any instance, the particles 400D may have the peripheral openings 432.

In practice, a sufficient number of compressed particles 400D are used to fill the metal wire 310A, or the metal tubular body 310B, depending on the embodiment, around the pipe body 220. As the annular pressure builds, the compressible particles 400D may begin to collapse, thereby absorbing pressure within the annular region 142 and reducing the likelihood of the pipe 220 collapsing during production operations.

Placement of any of the packings 230', 230", 300A or 300B along the casing in a wellbore enables the delivery of compressible particles 400D within a "trapped annulus." Using the packings described above, it is not necessary to pump compressible particles 400D ahead of a cement column (e.g., column 145) for placement within the annular area (e.g., annular area 142). Instead, the particles 400D are run into the wellbore with the casing and are placed at pre-designed depths for optimum mitigation of pressure.

The use of the tubular body 200 with a packing 230 or a screen 300A or 300B enables the operator to place the particles 236 or 400 in a specific location in the trapped annulus. For example, the operator may desire to keep the compressible particles central to the trapped annulus. In this instance, the operator may place one or more packings 230, 300A, 300B in series, generally halfway between the top and the bottom of the fluid column making up the trapped annulus.

In addition, the operator may adjust the compressibility response of the packings by extending or reducing the length of the packings 230', 230", 300A or 300B and/or increasing or reducing the compressibility of the particles 400D used and/or increasing or reducing the number of packings 230', 230", 300A or 300B in the wellbore within a trapped annulus 142.

It is preferred that the packings 230', 230", 300A, 300B cover about 80% of the length of the individual pipe body 220. The operator may place one, two, ten or even twenty tubular bodies 200 having the packings 230', 230", 300A, 300B along an annular region, e.g., annular area 142. The tubular bodies 200 may be connected in series, or may be spaced apart by placing standard casing joints between tubular bodies 200.

Figure 5:
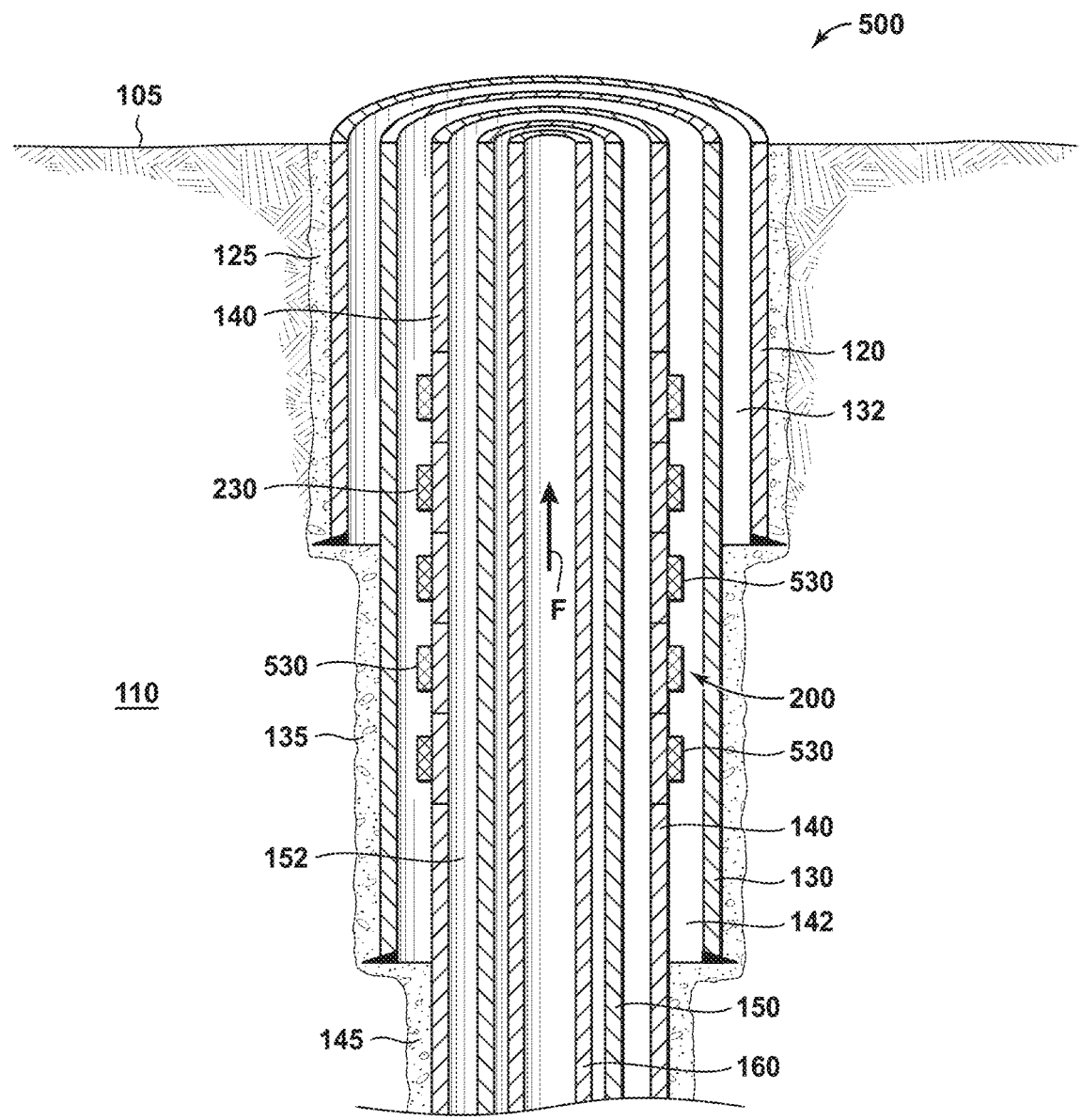
FIG. 5 is a perspective view of the upper portion of a wellbore having trapped annuli. An intermediate string of casing has received a series of packings of compressible particles, such as the packing of FIG. 2B or either of the rigid filters of FIG. 3A or 3B with the particles therein.

FIG. 5 is a perspective view of the upper portion of a wellbore 500. The wellbore 500 is in accordance with the wellbore 100 of FIG. 1B. In this respect, the wellbore 500 is completed with a series of casing strings including surface casing 120, intermediate casing strings 130 and 140, and production casing 150.

In FIG. 5, Arrow "F" is shown. This indicates a flow of production fluids during a hydrocarbon production operation. The production fluids are produced through a production string 160 known as production tubing. Formation fluids may flow to the surface 105 under in situ pressure; alternatively, formation fluids may be raised to the surface 105 using an artificial lift technique. The production fluids "F" are warm, causing a temperature within the various annular regions 132, 142, 152 to increase. This, in turn, may increase the temperature of the fluids within these annular regions 132, 142, 152, causing thermal expansion. The increase in temperature within the defined volumes may cause a corresponding increase in pressure, referred to as annular pressure build-up, or APB.

To mitigate APB and to prevent casing string 140 from collapsing (or to prevent casing string 130 from bursting), a series of packings 530 is shown. The packings 530 are affixed around the outer diameter of selected joints of casing along casing string 140. This is illustrative as it is understood that packings 530 may alternatively be placed along the inner diameter of casing string 140. It is also understood that packings 530 may be placed along the outer diameter of casing strings 120 and 150—or wherever there is a trapped annulus.

The packings 530 shown in FIG. 5 may be in accordance with any of the packing embodiments shown in FIGS. 2A through 2E. Alternatively, the packings 530 shown in FIG. 5 may be in accordance with either of the packing embodiments 300A or 300B shown in FIG. 3A or 3B.

Figure 6:
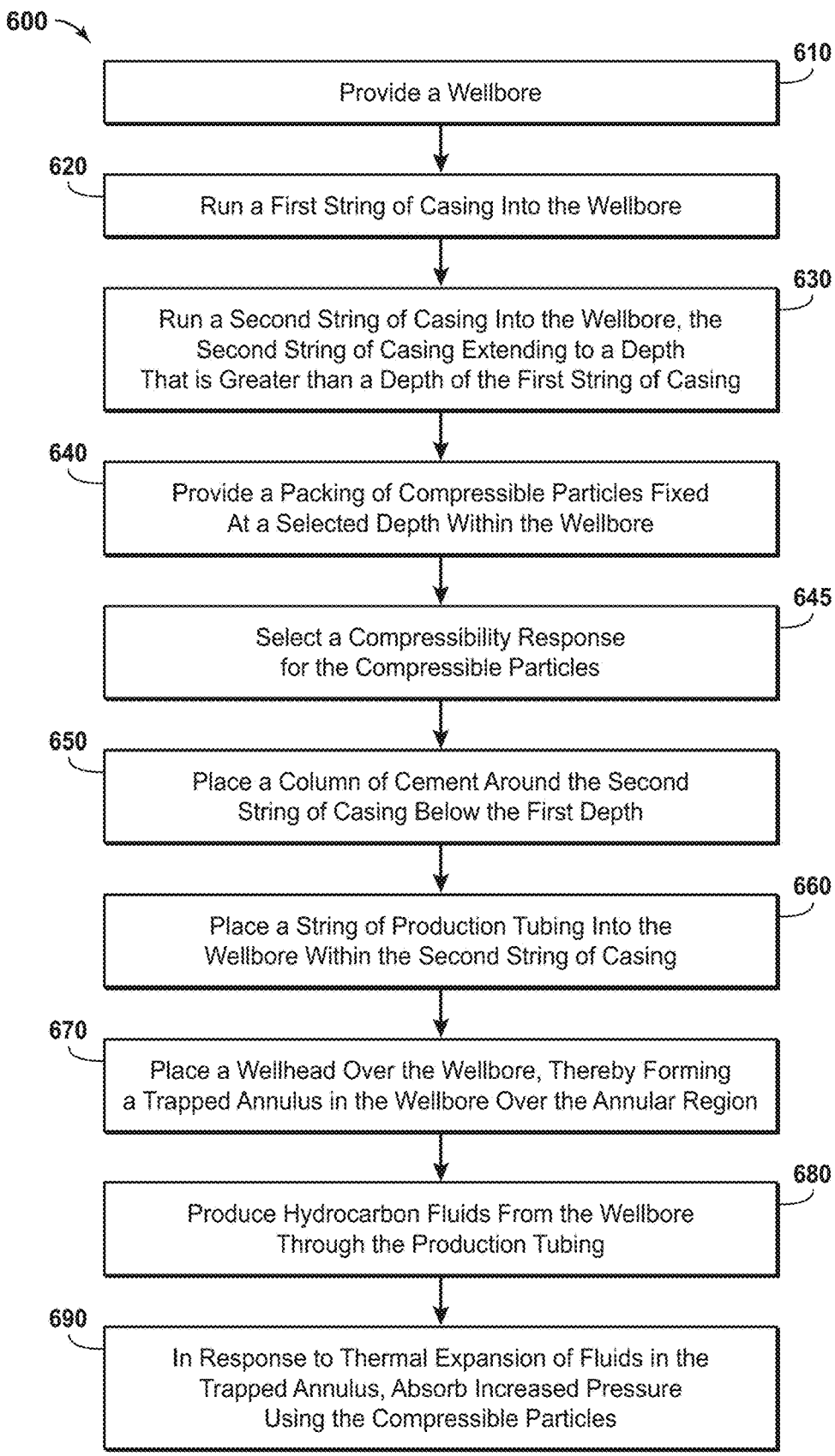
FIG. 6 represents a flow chart showing steps for a method of attenuating pressure in an annular region.

Based on these embodiments, a method of attenuating annular pressure buildup in a wellbore is provided herein. FIG. 6 presents a flow chart showing steps for a method 600 of attenuating pressure in an annular region.

In one aspect, the method 600 first comprises providing a wellbore. This is shown at Box 610. The wellbore may be any wellbore that is completed with at least two, and more likely at least three, strings of casing (not including conductor pipe). An example is the wellbore 500 of FIG. 5.

The method 600 also includes running a first string of casing into the wellbore. This is provided at Box 620. The first string of casing extends into a subsurface to a first depth. Note that "first string" is a relative term; this does not mean that it is the first string that is run into the wellbore, but only that it is first relative to a second string.

The method 600 additionally includes running a second string of casing into the subsurface. This is seen at Box 630. The second string of casing is run into the wellbore after the first string, and extends to a depth that is greater than the first depth. The second string of casing is preferably hung from a wellhead using a liner hanger. The first string of casing surrounds an upper portion of the second string of casing forming an annular region.

In one aspect, each of the first and second strings of casing is an intermediate casing string. In another aspect, the first string of casing is an intermediate string of casing while the second string of casing is a production casing.

The method 600 further comprises providing one or more packings of compressible material. This is offered in Box 640. The packings are fixed at selected depths within the annular region. This may be done by attaching the packings of compressible material to the inner diameter of the first string of casing, or more preferably by attaching the packings to the outer diameter of the second string of casing. It is noted that fixing the compressible material may mean mechanically or adhesively connecting the packing to a string of casing, or alternatively threadedly placing tubular bodies with packings of compressible material with a string of casing. Either arrangement constitutes placing one or more packings along the second string of casing.

The compressible material is designed to absorb pressure in response to thermal expansion of wellbore fluids within the annular region. Thermal expansion occurs over time during the production of warm hydrocarbon fluids from the wellbore.

In one aspect, the packing of compressible material comprises carbon particles bound together within a polymer matrix. More preferably, the carbon particles represent calcined coke.

In one aspect, the packing of compressible material comprises carbon particles bound together within a matrix, forming a sheet. A cylindrical body is formed from the sheet that friction fits around or is adhesively attached to a joint of casing. The compressible particles are held together within the matrix by means of a binder. The binder may be, for example, rubber, hydrogenated nitrile butadiene rubber (HNBR), nitrile butadiene rubber (NBR), fluoroelastomer (such as FKM) or a soft plastic.

In another aspect, the packing of compressible material comprises: an elastomeric sleeve placed along the outer diameter of the second string of casing; an upper collar securing the sleeve to the second string of casing at an upper end of the sleeve; a lower collar securing the sleeve to the second string of casing at a lower end of the sleeve; and a plurality of particles held loosely within the sleeve. Note that the term "loosely" simply means that the particles are not fixed within a polymer binder as a matrix.

Preferably, each of the plurality of particles comprises a carbonaceous particulate material. The particles together have a compressibility response (or "reversible volumetric expansion/contraction") of ≥3% at pressures up to 5,000 psi or at pressures between 15 psi and at least 5,000 psi or when subjected to a hydrostatic fluid pressure between atmospheric pressure (15 psi) to 5,000 psi, and ≥10% at pressures up to 10,000 psi or at pressures between 15 psi and at least 10,000 psi or when subjected to a hydrostatic fluid pressure between atmospheric pressure (15 psi) to 10,000 psi.

In another aspect, the packing of compressible material comprises: an elongated rigid, porous sleeve secured along the outer diameter of the second string of casing, or threadedly placed in series with the second string of casing; and a plurality of compressible particles held within the sleeve.

The rigid sleeve may be, for example, a wound screen or a slotted tubular body. Once again, the compressible particles may have a reversible volumetric expansion/contraction of ≥3% at pressures up to 5,000 psi or at pressures between 15 psi and at least 5,000 psi or when subjected to a hydrostatic fluid pressure between atmospheric pressure (15 psi) to 5,000 psi, and ≥10% at pressures up to 10,000 psi or at pressures between 15 psi and at least 10,000 psi or when subjected to a hydrostatic fluid pressure between atmospheric pressure (15 psi) to 10,000 psi.

The compressible particles may be carbonaceous materials comprising calcined petroleum coke and sulfur. Each of the particles comprises a plurality of peripheral openings, permitting an ingress of wellbore fluids in response to an increase in pressure within the annular region.

As part of Box 640, the method may further comprise securing the packing of compressible material to an outer diameter of a joint along the second string of casing before the second string of casing is run into the wellbore. The packing of compressible material may be, for example, between 5 feet and 25 feet in length. Where longer joints of casing (such as 40 feet) are used, a packing may be 30 feet or even 35 feet in length.

The method 600 may also include selecting a compressibility response for the compressible particles. This is shown in Box 645. Compressibility may be measured in terms of volumetric change per pressure change as:

$$\left(-\frac{1}{V}\frac{dV}{dP}\right)$$

with units as 1/psi; and
where: V=the initial volume,
dV=infinitesimal change in volume (positive value implies a positive change in volume); and
dP=infinitesimal change in pressure.

The compressibility of the particles should be greater than the compressibility of the drilling mud for the majority of the downhole pressure range experienced by the fluid mixture.

The method 600 additionally includes placing a column of cement around the second string of casing below the first depth. This is shown at Box 650. Then, a wellhead is placed over the wellbore, thereby forming a trapped annulus in the wellbore over the annular region. This is indicated at Box 670. A fluid mixture resides within the trapped annulus around the packing of compressible material.

The method 600 may then further comprise: placing a string of production tubing into the wellbore within the second string of casing (shown at Box 660); producing hydrocarbon fluids from the wellbore (shown at Box 680); and in response to thermal expansion of the fluid mixture in the trapped annulus, absorbing increased pressure using the compressible particles (shown at Box 690).

In connection with the method 600, the operator may select properties of the compressible particles. In the case where the compressible particles are secured within a cross-linked polymer or other binder, the operator may select particle size, particle diameter, and a compressibility response. In the case where the compressible particles are separate particles that are bundled into a compliant sleeve, the operator may select particle size, particle diameter, composition of the inner core, composition of the outer shell, porosity of the outer shell, and a compressibility response of the inner core.

The volume reduction of a collection of particles 400D lowers the pressure of the fluid mixture by allowing the less compressible oil- or water-based fluid to move into the volume created by the compressed particles, that is, the difference between reference shape "D" and the shape of the particle 400D in FIG. 4E. For the carbonaceous particles under study, the volume creation the compressed particles lend is expected to occur predominately between 3,000 psi and 15,000 psi.

As noted, the compressibility response is preferably optimized for the expected range of pressures. To this end, the following additional steps may be taken: determining a range of pressures expected to be experienced by the fluid mixture in the trapped annulus; and determining a maximum pressure for effectiveness of the compressible particles.

The following equation presents the anticipated incremental pressure build-up of the fluid mixture (base fluid+compressible particles) under isochoric (or constant volume) conditions:

$$\Delta P = \frac{\alpha_{mixture}}{\beta_{mixture}} \Delta T$$
$$= \frac{\alpha_{fluid}\phi_{fluid} + \alpha_{particle}\phi_{particle}}{\beta_{fluid}\phi_{fluid} + \beta_{particle}\phi_{particle}} \Delta T$$

where: $\Delta P$=incremental changes in pressure (psi);
$\Delta T$=incremental changes in temperature (° F.)
$\alpha_i(P,T)$=the homogenized isobaric coefficient of thermal expansion of material i (° F.$^{-1}$);
$\beta_i(P,T)$=the homogenized isothermal compressibility of material i (psi$^{-1}$); and
$\phi_i$=the volume fraction of material i.

Both $\alpha_i$ and $\beta_i$ depend on the fluid mixture's absolute temperature and pressure. The equation above demonstrates that for a unit temperature change, the pressure in the fluid mixture can be reduced by substituting fluid volume for particle volume as long as the coefficient of thermal expansion of the particles is lower than that of the fluid and/or the compressibility of the particles is higher than that of the fluid. Thus mitigation in pressure response is due (i) to the lower thermal expansivity coefficient of the carbon particles relative to that of the suspending fluid (when temperature changes are the source of loading) and (ii) the increased compliance of the porous carbon particles relative to that of the suspending fluid. Note that compressibility for the particles may derive from either material compression or fluid intrusion into pores.

In other embodiments, the thermal expansivity of the particles, $\alpha_i$, and compressibility of the particles, $\beta_i$, may depend on the pressure and temperature history that the fluid mixture has experienced.

For pressure to be effectively mitigated in the pressure ranges that are relevant to annuli in oil and gas wells, the open pores (that is, the peripheral openings) should have a graduated pore size distribution that extends into the range of a few nanometers. As the pressure in the fluid increases, the fluid moves into pores with throat radii that become increasingly small. It is believed that the nanometric size of the pores that are gas-filled at ambient pressure assist in providing particles a high compressibility at the absolute fluid pressures that are relevant for oil and gas wells applications. With the correct pore size distribution and stiffness of the carbon skeleton 400D, calcined and uncalcined petroleum cokes are expected to provide the desired APB relief when added to drilling fluids. Alternate particles—not composed of carbon, but with a similar pore-size distribution and skeletal stiffness—may be used to provide similar mitigation in APB.

To investigate the relative contribution of the listed mechanisms in providing fluid-particle mixtures their compressibility, the following data might be collected:

Pore-size-distribution of calcined and uncalcined petroleum cokes calculated from mercury intrusion porosimetry and $N_2$-gas adsorption experiments.

Helium density measurements of calcined and uncalcined petroleum cokes.

Pressure response of fluid-particle mixtures in a piston cell. It is proposed that fluid mixtures include in one instance unaltered carbon particles and in another instance particles that are coated in a polymeric resin. The resin coated particles should eliminate access to the open pore network by the fluid. Comparison of the pressure response between these two systems might allow assessment of the relative importance of the open pore network (rather than the pore network that is closed-off to fluid intrusion) in providing pressure relief.

Particles having a variety of profiles may be employed. For example, some particles may have a circular profile while others may have an oval profile. This enhances the ability of the particles to sense pressure changes and to compress more uniformly. Particles having a variety of porosity values may also be selected. In one aspect, the compressible particles have an average porosity of between 20% and 40%. This does not include any porosity that is open to fluid/gas ingress.

The carbon matrix with closed pores may have a density of about 1.49 gram per cubic centimeter (g/cc), while a graphitic matrix may have a density as high as 2.26 g/cc. Preferably, the carbon particles may have a mean true density between 1.2 and 1.8 g/cc—as measured by helium pycnometry.

As may be appreciated, the different steps in the method of FIG. 6 may be modified to have different steps performed in a different order. For example, the selection of a compressibility response for the compressible particles in Box 645 may be performed prior to providing a packing of compressible particles fixed at a selected depth within the wellbore, as shown in Box 640.

An alternative solution to alleviating pressure build-up in an annular area (such as area 142) is to use collapsible particles dispersed in the fluid residing along the fluid column in the annular area. Once again, the particles are volumetrically compressed (as shown in FIG. 4E) as the pressure increases during production operations, resulting in additional volume into which the fluid can expand. This may be in lieu of or in addition to use of packings 230', 230'', 300A or 300B.

As can be seen, a unique method for attenuating pressure in a trapped annulus is also provided. The method takes advantage of the use of a packing of compressible particles fixed along a joint of casing within a wellbore. The packing allows the operator to select the depth at which the particles are placed along the trapped annulus without having to worry about free particles floating to the top of the column or settling at the bottom of the column along the trapped annulus. Stated another way, the operator can use particles 400D having a desired compressibility without worrying about bed heights at the bottom or the top of the annulus. Since the particles are contained, the bed height is generally pre-determined by the height of the packings, the depths of the packings and the number of tubular bodies employed in series. Further, the operator may be less concerned with particle density since buoyancy is not a factor.

To alleviate APB and to protect the adjacent casing strings, the particles are volumetrically compressed. This results in additional volume into which the fluid can expand as the pressure increases during production operations.

It is also noted that pressure within an annular region may also increase in response to mechanical strain of the annular volume. This can happen, for instance, due to geo-mechanical loading by the containing formation. In this instance, the compressible particles may act at least nominally against such loading, preventing buckling when forces begin to arise.

Figure 7:
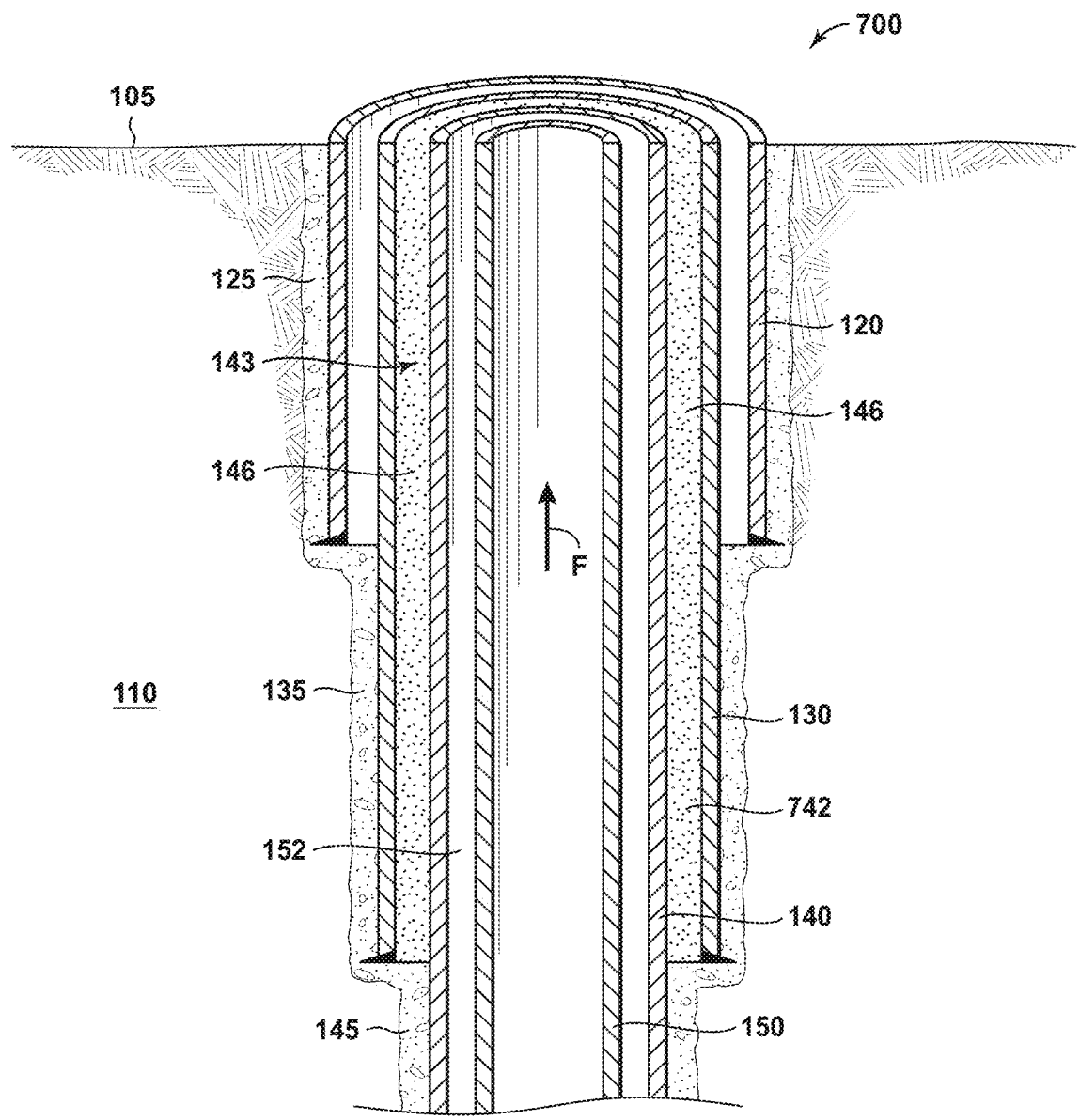
FIG. 7 is another perspective view of the upper portion of a wellbore, in an alternate embodiment. In this instance, a column of carrier fluid holding compressible particles is placed in the unfilled annular space around an intermediate string of casing. The compressible particles are suspended in and dispersed along the column of carrier fluid.

FIG. 7 is a cross-sectional view of the upper portion of a wellbore 700 in an alternate embodiment. The wellbore 700 extends into a subsurface formation 110. The wellbore 700 is generally completed in accordance with the wellbore 500 of FIG. 5 and need not be described in detail. However, instead of using packings 530 along the annular region 742, a column of carrier fluid 143 holding a collection of compressible particles 146 is placed in the unfilled annular space 742 around an intermediate string of casing 140. The compressible particles 146 are in accordance with particle 400D described above, but have been suspended in and dispersed along the column of carrier fluid 143.

The carrier fluid 143 is placed in what may otherwise be a "trapped annulus" 742 above a column of cement 145. In the arrangement of FIG. 7, the compressible particles 146 are suspended in and dispersed somewhat evenly along the column of carrier fluid 143.

During production, hydrocarbon fluids are lifted to a surface 105 in accordance with Arrow F using a production tubing (such as tubing 160 of FIG. 5). Formation fluids may flow to the surface 105 under in situ pressure; alternatively, formation fluids may be raised to the surface 105 using an artificial lift technique. In either instance, as formation fluids are produced according to Arrow F, the temperature in the wellbore 600 may increase. This, in turn, may increase pressure within the trapped annulus 642 due to fluid expansion.

To alleviate this pressure and to protect the adjacent casing strings 130, 140, the particles 146 are volumetrically compressed as shown in FIG. 4E. This results in additional volume into which the fluid can expand as the pressure increases during production operations.

To maximize the effectiveness of the compressible particles 146, it is ideal if all of the particles 146 are exposed to pressure within the trapped annulus 542 equally. In this way the particles 146 can compress proportionally. This may not be achieved if all of the particles 146 rise together to the top of the trapped annulus 542. In this respect, at least some of the particles 146 may be lost during the periodic annulus bleed downs that occur during production operations.

Similarly, it may be undesirable for the particles 146 to settle together at the bottom of the fluid column 143, forming a bed. Such a bed would represent a collection of particles 146 which, depending on the number of particles used and the height and area of the annulus 742, could prevent pressure contact across all of the fluid column 143. Stated another way, fluid pressure may not fully penetrate through the entirety of the bed height. In addition, if the particles 146 settle tightly anywhere along the fluid column 143 they could build an impermeable bridge resulting in trapping that, without the addition of the compressible particles 146, was an open annulus along the fluid column 143, thus creating a problem where previously none had existed.

To address the problem of an aggregating of particles, the fluid mixture may provide for a slightly varied density among the particles 146. In this respect, some or all of the particles 143 may be biased to rise higher up the annular region 742 by reducing the density of the particles; reciprocally, some or all of the particles 146 may be biased to sink lower into the annular region 742 by increasing the density of the particles 146. Thus, one aspect of the present invention may include designing a fluid mixture having compressible particles with two or more slightly different densities.

Figure 8:
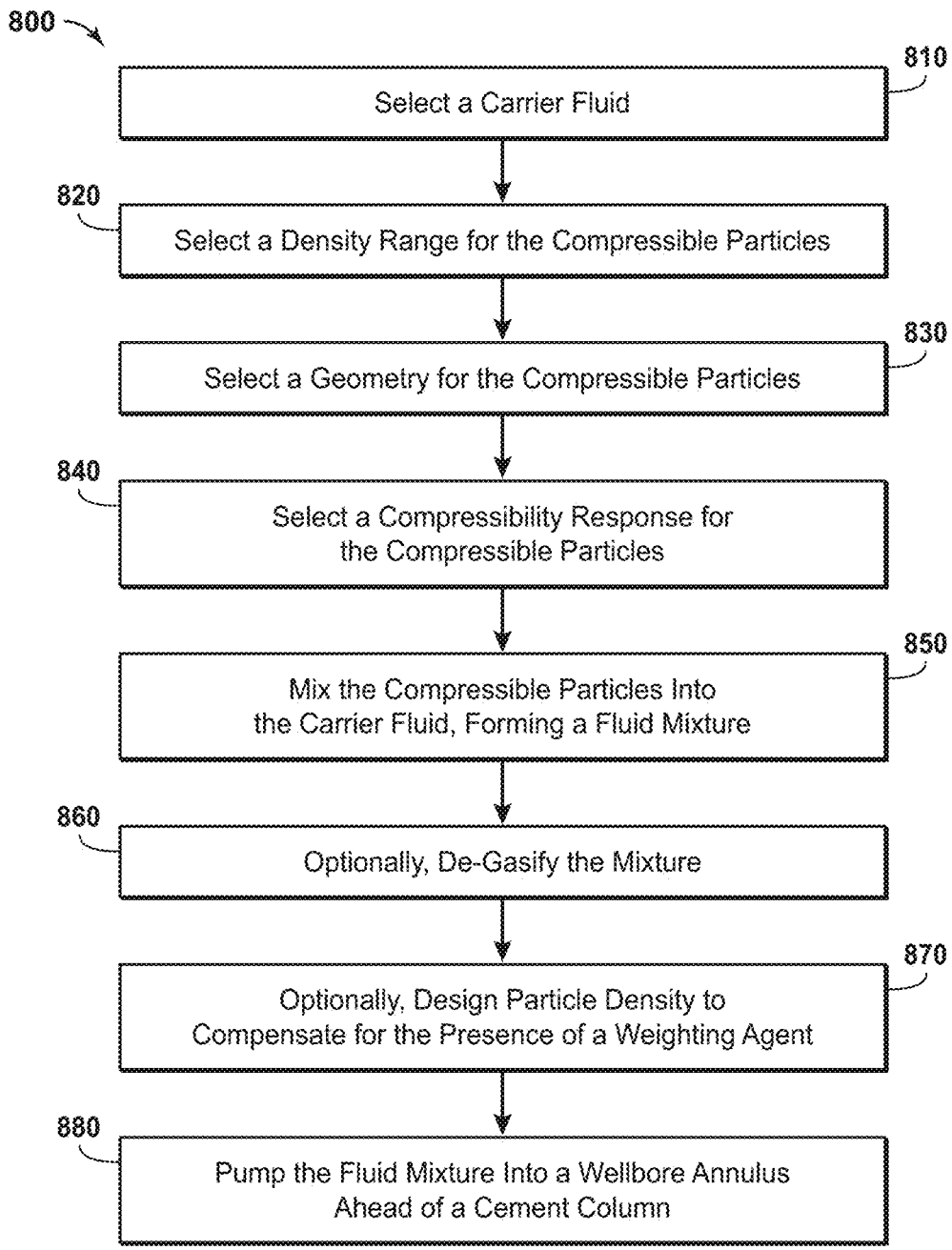
FIG. 8 is a second flow chart. Here, the flow chart shows steps for a method of preparing a fluid mixture having compressible particles.

FIG. 8 is a second flow chart. This flow chart shows steps for a method 800 of designing a mixture having compressible particles. The mixture may be comprised of the carrier medium 143 and the compressible particles 146. The aim of the method 800 is to provide for a desired distribution of particles 146 across a trapped annulus 542.

In one embodiment, the method 800 first includes selecting a carrier fluid. This is shown in Box 810. The carrier fluid is preferably an aqueous liquid comprised primarily of fresh water or salt water. A water based or an oil based drilling fluid may also be considered wherein the drilling fluid comprises a weighting agent.

Fresh water, of course, has a specific gravity of 1.0. Where salt or minerals are present, the specific gravity may be increased. The carrier fluid may need to be blended to ensure a generally homogenous composition and specific gravity.

The method 800 next includes selecting a density range for the compressible particles 146. This is provided in Box 820. The particles 146 may have a range in density from 12.0 pounds per gallon ("ppg") to 12.8 ppg at ambient conditions. Ideally, the compressible particles 146 may have a specific gravity ("SG") that is close to that of the carrier fluid 143. Preferably, the SG of the compressible particles 146 may have a range of plus/minus 0.5 of the carrier fluid 143. This may prevent particles from all settling at the bottom or from all rising to the top of the narrow annulus 742, forming a bed that isolates the annulus (or at least many of the particles) from pressure.

Note that because the particles are, by design, compressible, particle density is dependent on pressure. At ambient conditions, the particles' density is around 12.5 ppg. If pressured to 10,000 psi, the density of the particles might increase to around 15 ppg.

The method 800 additionally includes selecting a geometry for the compressible particles. This is seen in Box 830. Geometry refers to both shape and size. The compressible particles may range in size from 100 μm to 900 μm in diameter, depending on the specific particle size distribution. More preferably, the particle size distribution may be between 200 μm and 400 μm. Where calcined petroleum coke particles are used, the shape may likely be amorphous.

The method 800 further includes selecting a compressibility response for the particles. This is shown in Box 840. Compressibility may be measured in terms of volumetric change per pressure change (dV/dP) and has units of psi$^{-1}$ as described above. Each of the particles may have a compressibility response of between 10% and 25%, and more preferably between 14% and 27%, inclusive, up to 10,000 psi. It is understood that there is a technical difference between degree of compressibility, which is represented as $$\left(-\frac{1}{V_0}\frac{dV}{dP}\right),$$

and volume contraction, which is $$\left(-\frac{\Delta V}{V_0}\right).$$

For purposes of the present disclosure, the term "compressibility response" refers to both concepts.

At the same time, each of the particles may also have a resiliency of between 80% and 120%, and more preferably between 87% and 117%, inclusive.

Figure 9A:
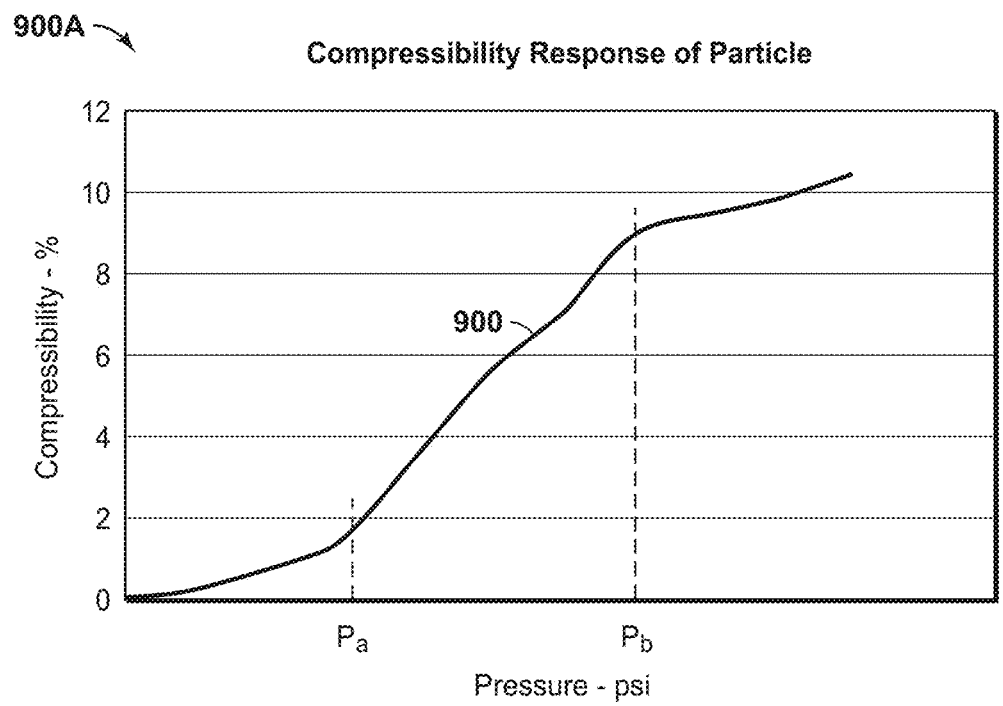
FIG. 9A is a first Cartesian chart showing compressibility of particles as a function of pressure. This demonstrates a "compressibility response."

FIG. 9A is a Cartesian chart 900A showing a compressibility of a particle. Compressibility is indicated along the y-axis as a percentage of volumetric change, while pressure (measured in psi) is shown on the x-axis. Line 900 demonstrates a compressibility response, or volumetric expansion/contraction, of the particle as pressure increases. It is noted here that for purposes of reducing a pressure response within a trapped annulus, the term "compressibility response" refers to a volume strain on a collection of particles within a packing, or to the overall volume percent reduction. Individually, some particles may compress more than others.

To maximize the effectiveness of compressible particles, the pressure acting on those particles ideally would be within the area of a compressibility curve that maximizes the volumetric change per pressure change (dV/dP). In FIG. 9A, this resides within $P_A$ and $P_B$. To optimize the performance of the particles, they should be placed at a depth (initial hydrostatic pressure) where the particles exhibit high compressibility, and have sufficient volumetric contraction left (i.e., the particles are not close to being fully compressed at the initial hydrostatic pressure).

When fixed along an annulus, the compressible particles should be designed such that the predicted pressure P at the position of placement is within the maximum dV/dP capabilities of the particles. This would be within the range between $P_a$ and $P_b$ of FIG. 7A. $P_a$ may be the initial pressure state of the annulus before the annulus builds up pressure. $P_b$ represents a final pressure state of the annulus after productions operations have commenced and the wellbore has warmed.

The depth of this pressure range $P_a$-$P_b$ can be found by calculating the expected pressure profile within the annulus. The end result of this is that compressible particles are placed to maximize the effectiveness of their compressibility response.

As part of selecting a compressibility response, the step of Box 840 may include designing the compressible particles to have an optimum pressure performance at an upper end of the range of expected pressures. This aspect of the step of Box 840 may involve selecting a lowest depth at which the compressible particles may reside in the annular region.

It is observed that the step of Box 840 has equal utility to the method 600 of FIG. 6. As an aside, the operator may choose to place particles having a higher degree of compressibility in packings residing at shallower locations along the wellbore. Reciprocally, the operator may choose to place particles having a lower degree of compressibility in packings residing along joints that are at or deeper locations along the wellbore.

As another option, the particles may have different densities, corresponding to their compressibility responses. Some particles may have a lower density and a higher compressibility response. Still others may have a slightly lower density and a slightly higher compressibility response. At the same time, some particles may have the highest density and the lowest compressibility response.

Figure 9B:
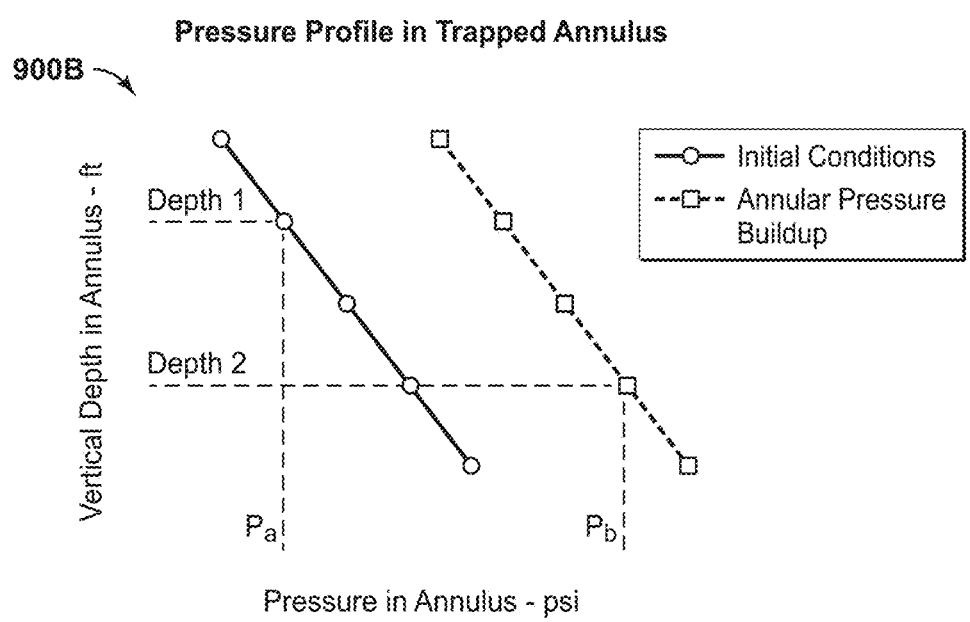
FIG. 9B is a graph showing a pressure profile within the annular region of a wellbore. Pressure is shown as a function of depth, both before and after pressure build-up due to production operations.

FIG. 9B is a graph 900B showing a pressure profile within the annular region of a wellbore. Vertical depth within the annulus is shown on the y-axis, measured in feet, while pressure in the annulus is shown on the x-axis, measured in psi. Once again, the pressure values $P_A$ and $P_B$ are indicated, meaning pressure both before and after pressure build-up.

Two different depths are shown in FIG. 9B, referenced as Depth 1 and Depth 2. Depth 1 indicates an upper portion of a trapped annulus while Depth 2 indicates a lower portion of a trapped annulus. Depth 2 is obviously lower than Depth 1.

Figure 10:
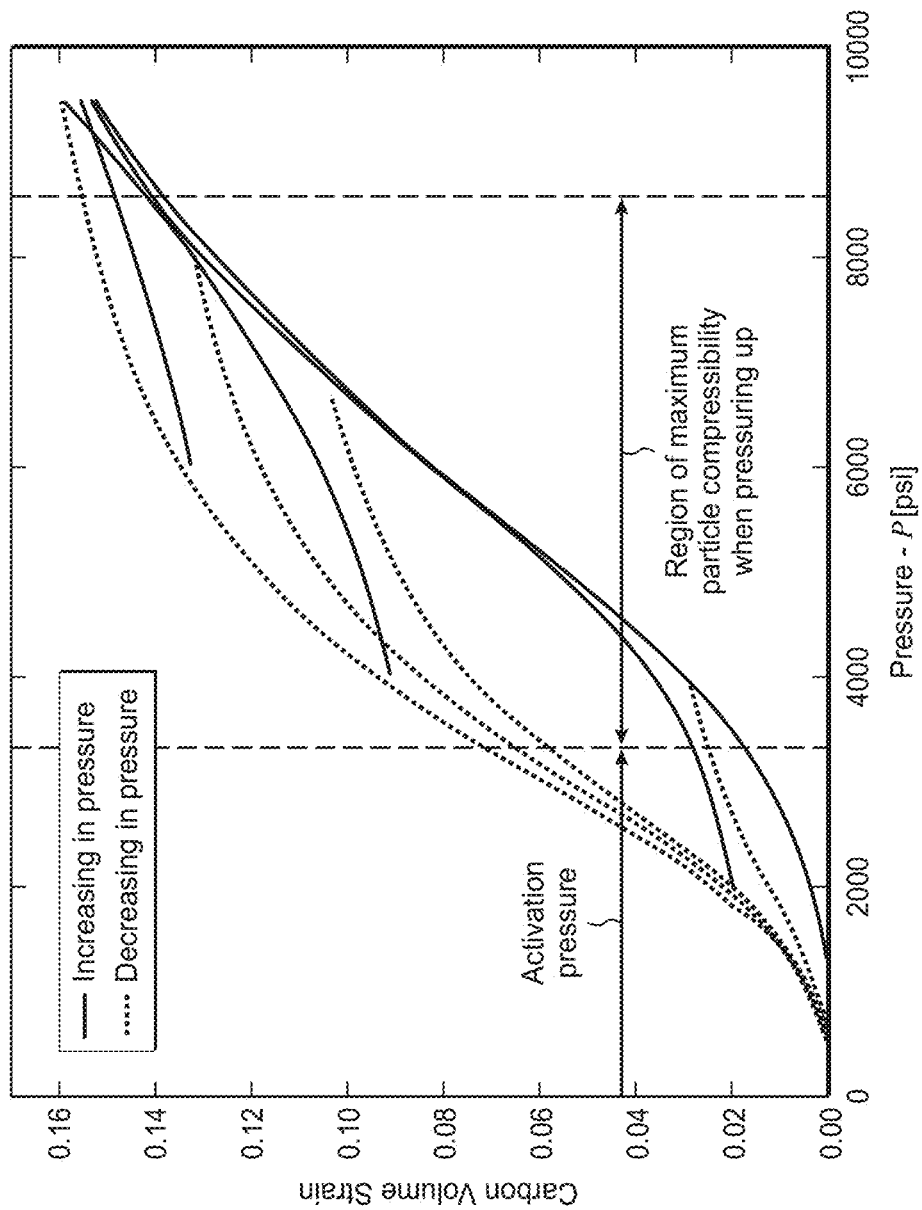
FIG. 10 is a second Cartesian chart showing strain imposed on carbon particles as a function of pressure. In this instance, compressibility response is expressed as carbon volume strain.

FIG. 10 is a second Cartesian chart showing volume strain applied to the graphitic particles produced by Superior Graphite Co. as a function of pressure. In this instance, compressibility is expressed as carbon volume strain. It is observed that carbon strain is a path-dependent function of pressure. As pressure increases, volume strain also increases.

The operator may use staged fluid displacements to place particles having different compressibilities along the annular region. This means that the operator may pump down carrier fluid carrying particles having a higher degree of compressibility first, followed by particles having a slightly lower degree of compressibility second, followed still by particles having an even lower degree of compressibility third, and so forth. Preferably, no more than three stages would be employed.

Once the carrier fluid (or fluid column) 143 is placed within the annulus 742, some re-settling of particles 146 may take place. Particles 146 having the lowest density may slowly rise to the top of the fluid column 143 while particles 146 having the highest density may slowly settle towards the bottom. As an option, the operator may choose to deliberately place particles within an annular region 742 in stages. Particles 146 with a lower density and a higher compressibility response may be pumped down first. This would be followed by particles 146 with a slightly lower density and a slightly higher compressibility response. Particles 146 having the highest density and the lowest compressibility response would be pumped down last, just ahead of the cement. In this arrangement, two to five stages of fluid displacement may be employed.

In any instance, where a carrier medium 143 carrying compressible particles 146 is pumped down a wellbore (such as wellbore 500), the operator may need to mix the particles into the fluid first. This is provided at Box 850. Preferably, the compressible particles 146 are mixed into the fluid 143 at a concentration of 5% to 40% by volume. The greater the concentration of particles there is, the greater the overall compressibility the fluid column 143 may have. Thus, overall compressibility is impacted not only by the degree of compressibility of the individual particles along the column 143, but also by the number of particles 146 provided.

In connection with the mixing step of Box 850, the operator may choose to add additives to the mixture in order to increase the rheological properties (e.g., plastic viscosity, yield point value, and gel strength) of the mixture. Such additives may include one or more natural and/or synthetic polymeric additives, polymeric thinners, or flocculants. The purpose of such additives is to alter the gel strength of the fluid 143 to inhibit particle settling.

Alternatively, the operator may provide an electric or magnetic charge to the particles to keep them suspended. Alternatively still, the particles may be coated with a material having an electrical or magnetic charge to inhibit settling.

The method 800 may optionally include de-gasifying the mixture, as shown at Box 860. The method 800 may also optionally include adjusting particle density to compensate for the presence of a weighting agent. This is indicated at Box 870.

A lower density can be achieved by designing an increased particle size, increased pore volume, or providing random diameters or shapes that mitigate packing. Preferably, the density of the carrier fluid 143 is between 12 ppg and 12.8 ppg (1.43 g/cc to 1.54 g/cc) and the densities of the compressible particles 146 span across this range. In one aspect, the particles 146 may range in density from 0.5 to 2.5 specific gravity. A uniform suspension of particles 146 can be achieved by designing the carrier fluid 143 density to generally match the density of the particles 146 (or vice versa). The density of the carrier fluid is generally chosen within a range that permits or eases drilling operations.

In one embodiment, the compressible particles comprise: first compressible particles having a first degree of compressibility; and second compressible particles having a second degree of compressibility; and wherein the first degree of compressibility is higher than the second degree of compressibility.

In another embodiment, the compressible particles comprise: first compressible particles having a first density; and second compressible particles having a second density; and wherein the first density is greater than the second density. Further, the densities may be selected to differ by a specific amount. For example, the mean of the second density is at least 20% different from the mean of the first density or the mean of the second density is at least 30% different from the mean of the first density.

FIG. 8 finally includes the step of pumping the mixture (that is, the carrier fluid with suspended compressible particles) into a wellbore annulus. This is seen in Box 880. The carrier fluid is pumped in ahead of the cement column. Again, this step would not be employed where packings are used.

Beneficially, when the carbon particles are run into the wellbore attached to the casing, and are not circulated down the casing, to the bottom of the well and back up the annulus, this prevents the carbon particles from seeing a maximum hydrostatic pressure in the wellbore, which could cause the particles to become pre-compressed or to experience residual strain that prevents them from functioning properly. By reducing the maximum pressure the carbon particles see prior to shutting them in the annulus, the amount of mitigation the carbon particles are expected to provide is enhanced. Additionally, because the carbon particles are placed at designated depths, the operator is able to optimize the zone of a compressibility curve wherein the carbon particles reside.

The present techniques may also include providing certain enhancements for the compressible particles. Compressible particles, such as compressible carbon, having a low thermal coefficient of expansion and high compressibility may be used. The compressibility provides the drilling mud (or other carrier fluid) additional volume (on a relative per unit volume basis) to expand into upon being heated. The compressibility of the carbon particles may be enhanced by a closed porosity that is sealed to fluid ingress.

Additional porosity exists on the surfaces of the particles that is open to fluid ingress. These may be referred to as open pores. Upon pressuring the carbon, the open and closed pores collapse, allowing the particles to shrink and provide volume for the fluid surrounding the particles to move into. Upon reducing the fluid pressure around the carbon, the particles rebound into their original shape, while keeping the closed porosity dry.

It is believed that the compressibility of the particles may be enhanced if the particles are embedded in ethylene propylene rubber ("EPR"), rubber, nitrile butadiene rubber (NBR), fluoroelastomer (FKM), hydrogenated nitrile butadiene rubber (HNBR) or a soft plastic or coated in an impermeable resin or polymeric coating. When carbon is embedded in a rubber, such as an EPR or other polymer that forms a tightly packed, impermeable chain network, both closed and open pore spaces remain free of fluid ingress under hydraulic pressurization. This means that the particle remains liquid-sealed. Because the sealed porosity is increased when carbon is placed into the polymer, additional pore volume exists that collapses when the pressure around the particles is increased. In other words, surrounding the particles with an impermeable polymeric coating makes the external pore space useful; the coating or thin sheet is a means of maximizing the efficacy of the particles' pore spaces and thus maximizing the compressibility.

As another example, compressible particles, such as carbon particles, without an elastomeric coating exhibit large compressibility between 3,000 psi and 7,000 psi, but above 7,000 psi, the particles' compressibility decreases. The stiffness of the coating or rubber can be engineered to support some of the stress being enacted by the fluid pressure onto the particles. This shifts or extends the pressure range over which the carbon particles significantly compress. Thus, with the elastomeric coating the particles exhibit continued compressibility even beyond 10,000 psi.

Additional porosity exists on the surfaces of the particles that is open to fluid ingress. These may be referred to as open pores. Upon pressuring the carbon, the open and closed pores collapse, allowing the particles to shrink and provide volume for the fluid surrounding the particles to move into. Upon reducing the fluid pressure around the carbon, the particles rebound into their original shape, while keeping the closed porosity dry.

Figure 11A:
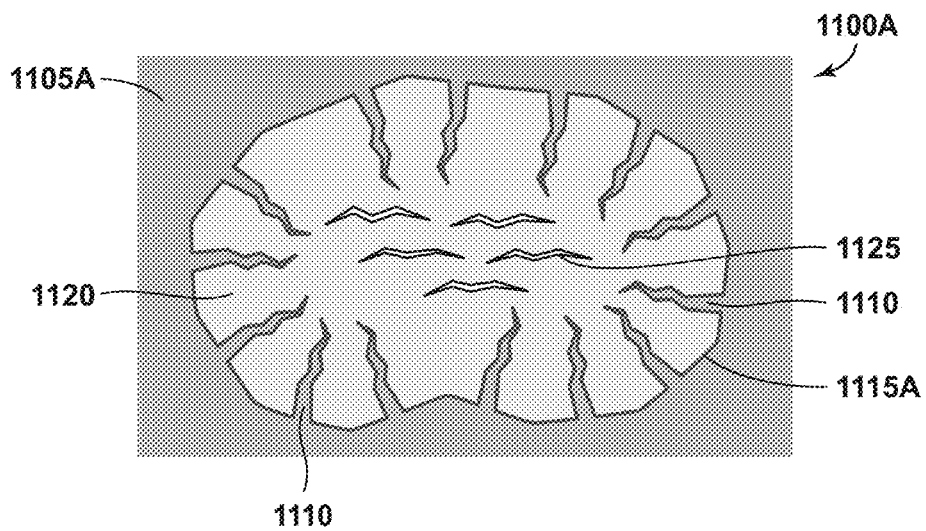
FIG. 11A shows a carbon particle suspended in a fluid, such as brine.
Figure 11B:
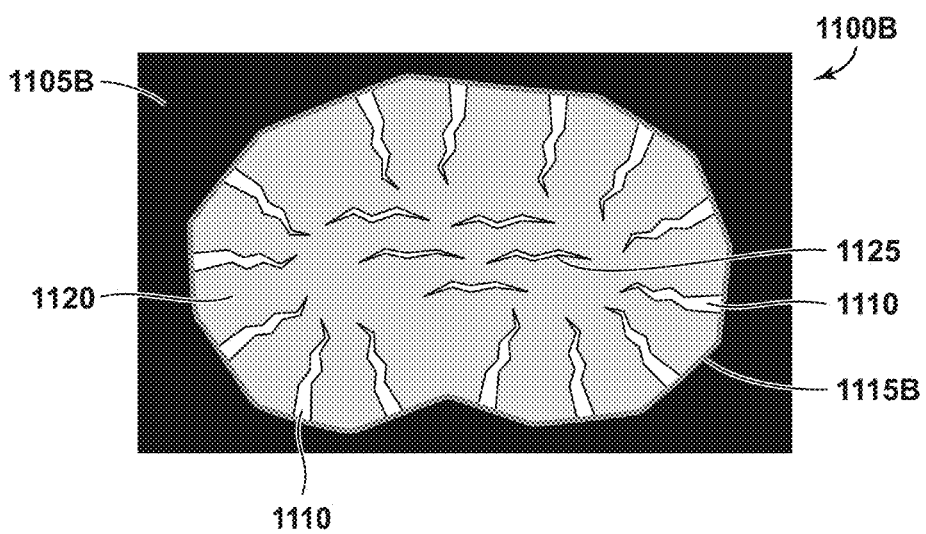
FIG. 11B shows a carbon particle embedded in a polymeric rubber matrix, or sheet.

FIGS. 11A and 11B are top views of illustrative carbon particles. Here, the views depict a single, solid carbon particle having a plurality of openings. FIG. 11A shows a carbon particle 1100A suspended in a fluid 1105A. The fluid 1105A may be either brine or a non-aqueous fluid. The particle 1100A has an amorphous shape. The particle 1100A defines a body 1120 bounded by a peripheral surface 1115A. A plurality of openings 1110 reside around the peripheral surface 1115A. In addition, intragranular pores 1125 are present. The openings 1110 and the pore spaces 1125 provide for a porous carbon particle.

It is observed that the openings 1110 along the periphery 1115A are capable of receiving an ingress of wellbore fluids 1105A. In the view of FIG. 11A, the particle 1100A is experiencing what would be considered to be a usual pressure within the annular region of a wellbore. The pressure is governed primarily by the hydrostatic head of fluid residing within the annular region. One may refer to this as the ambient pressure. Wellbore fluids 1105A remain largely external to the particle 1100A until pressurization.

In FIG. 11A, the internal porosity 1125 remains sealed and free of fluid ingress under pressure. The open porosity 1125 is in communication with the particle's external environment and remains free to fluid imbibition under pressure. This is consistent with FIG. 5A. As pressure increases (as shown in FIG. 5B), the particle 1100A may experience compression, or strain. However, there is concern that fluid invading the peripheral openings 1110 and possibly pore spaces 1125 may limit the extent of compressibility.

It is believed that the compressibility of the particles may be enhanced if the particles are embedded in a rubber, or coated in an impermeable resin or polymeric coating. When carbon is embedded in a rubber, such as an ethylene propylene rubber ("EPR"), hydrogenated nitrile butadiene rubber (HNBR), nitrile butadiene rubber (NBR), fluoroelastomer (FKM) or other polymer that forms a tightly packed, impermeable chain network, both closed and open pore spaces remain free of fluid ingress under hydraulic pressurization. This means that the particle remains liquid-sealed. Because the sealed porosity is increased when carbon is placed into the polymer, additional pore volume exists that collapses when the pressure around the particles is increased. In other words, surrounding the particles with an impermeable polymeric coating makes the external pore space useful; the coating or thin sheet is a means of maximizing the efficacy of the particles' pore spaces 1110, 1125 and thus maximizing the compressibility.

FIG. 11B shows another carbon particle 1100B. Here, the carbon particle 1100B is represented as being embedded within a polymeric rubber matrix 1105B, such as NBR, HNBR, FKM or EPR. The matrix may be, for example, a thin sheet. The carbon particle 1100B has an amorphous shape and is shown at ambient conditions. The carbon particle 1100B defines a body 1120 bounded by a peripheral surface 1115B. A plurality of openings 1110 reside around the peripheral surface 1115B. In addition, intragranular pores 1125 are again present.

Beneficially, preserving the open pore spaces 1110, 1125 maintains buoyancy of the compressible particle 1100B. In one implementation, compressible coke particles are embedded in an incompressible rubber (polymeric rubber matrix 1100B) to eliminate particles settling in an annular region after placement. During production, transmission of fluid stress is effected onto the particles 1100B through the rubber matrix 1105B.

Figure 12:
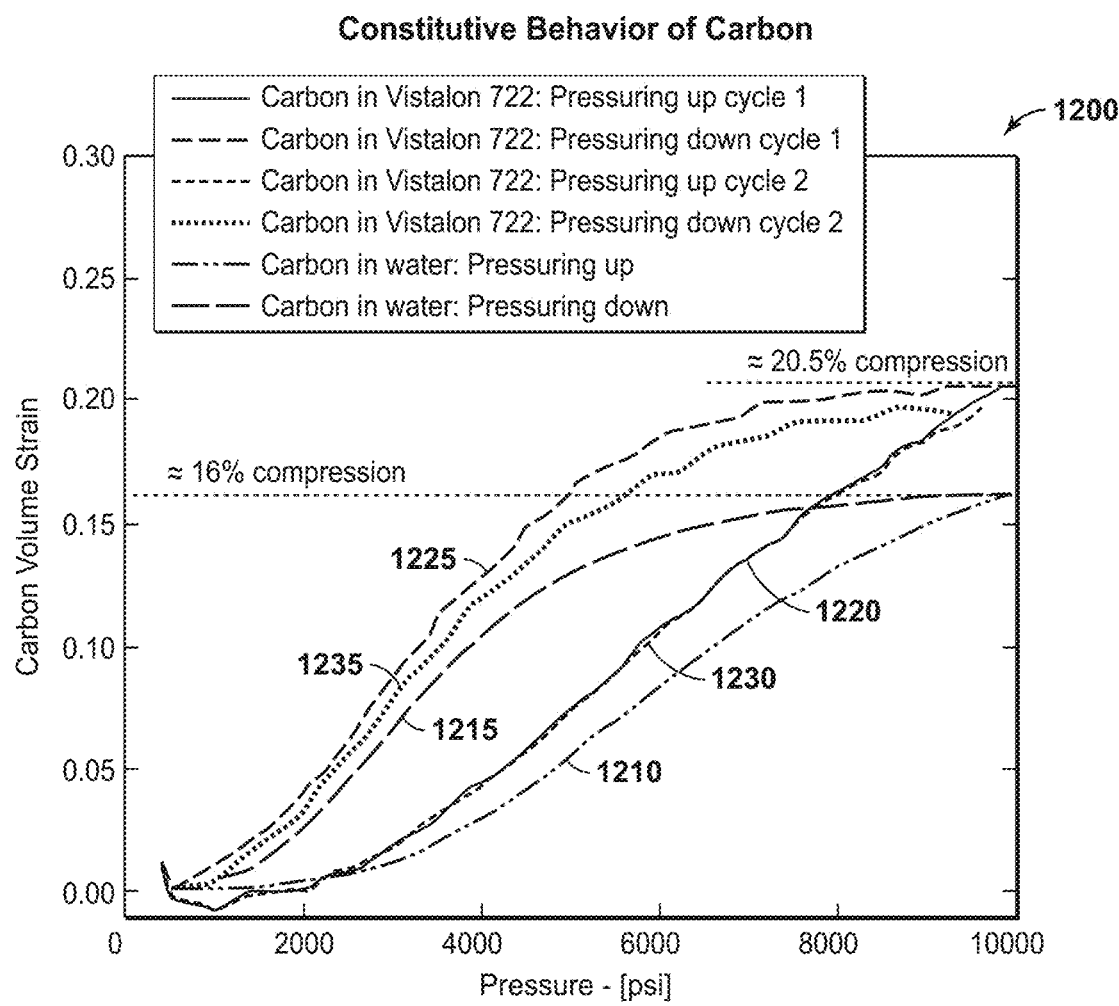
FIG. 12 is a Cartesian coordinate showing carbon volume strain (along the y-axis) as a function pressure (along the x-axis). Carbon particles with and without a rubber coating are tested to measure compressibility.

FIG. 12 provides a Cartesian coordinate 1200 showing volume strain (along the y-axis) as a function pressure (along the x-axis). Stated another way, FIG. 12 presents a chart of experimentally recorded volume strain experienced by carbon particles as a function of applied hydraulic pressure. Pressure is presented in units of psi, ranging from 500 psi up to 10,000 psi.

Two different types of carbon particles were tested for compressibility—particles without a polymeric coating, and then particles with a polymeric coating. The coating applied in this test was an ethylene propylene diene monomer rubber (or EPDM synthetic rubber). Specifically, Vistalon™ 722 produced by ExxonMobil Chemical Company in Baytown, Tex. was used as the coating.

Line 1210 shows carbon particles in water during a Pressuring Up (or compression) cycle. These particles did not have the polymeric coating. Carbon particles were mixed into a fluid slurry and then placed into a pressure vessel of known volume.

Line 1215 shows the same carbon particles during a Pressuring Down (or decompression) cycle. Here, carbon particles were embedded in a rubber sheet approximately 5"×5"×0.1" in size. The sheet was then lowered into the water packed vessel and held under pressure for a period of days. This ensured saturation of all fluid-accessible pore spaces in the polymer.

Line 1220 shows carbon particles coated in Vistalon™ during a first Pressure Up cycle. Line 1225 shows the same carbon particles during the ensuing Pressure Down cycle. Line 1230 shows the carbon particles coated in Vistalon™ during a second Pressure Up cycle. Line 1235 shows the carbon particles during the second Pressure Down cycle. The tests show enhanced compressibility of the particles when coated with the polymeric material. Greater compressibility is achieved for the coated particles at lower pressures.

It is noted that "coating" of the compressible carbon particles 1100 may mean placing the particles 1100B into a polymeric rubber matrix 1100B. Thus, the polymeric rubber matrix 1105B may represent a matrix in the form of a sheet, as opposed to a liquid slurry of coated particles.

FIG. 12 demonstrates that when pressuring the systems from 500 psi to 10,000 psi, carbon particles that were suspended in water strained by approximately 16% of their original volume, while particles that were embedded in EPR strained by approximately 20.5% of their original volume. In both cases, the original (un-pressurized) carbon volume was calculated using the particles' Helium density (as measured by Helium pycnometry)—that is, the results were normalized on a per-gram-of-carbon basis.

Figure 13:
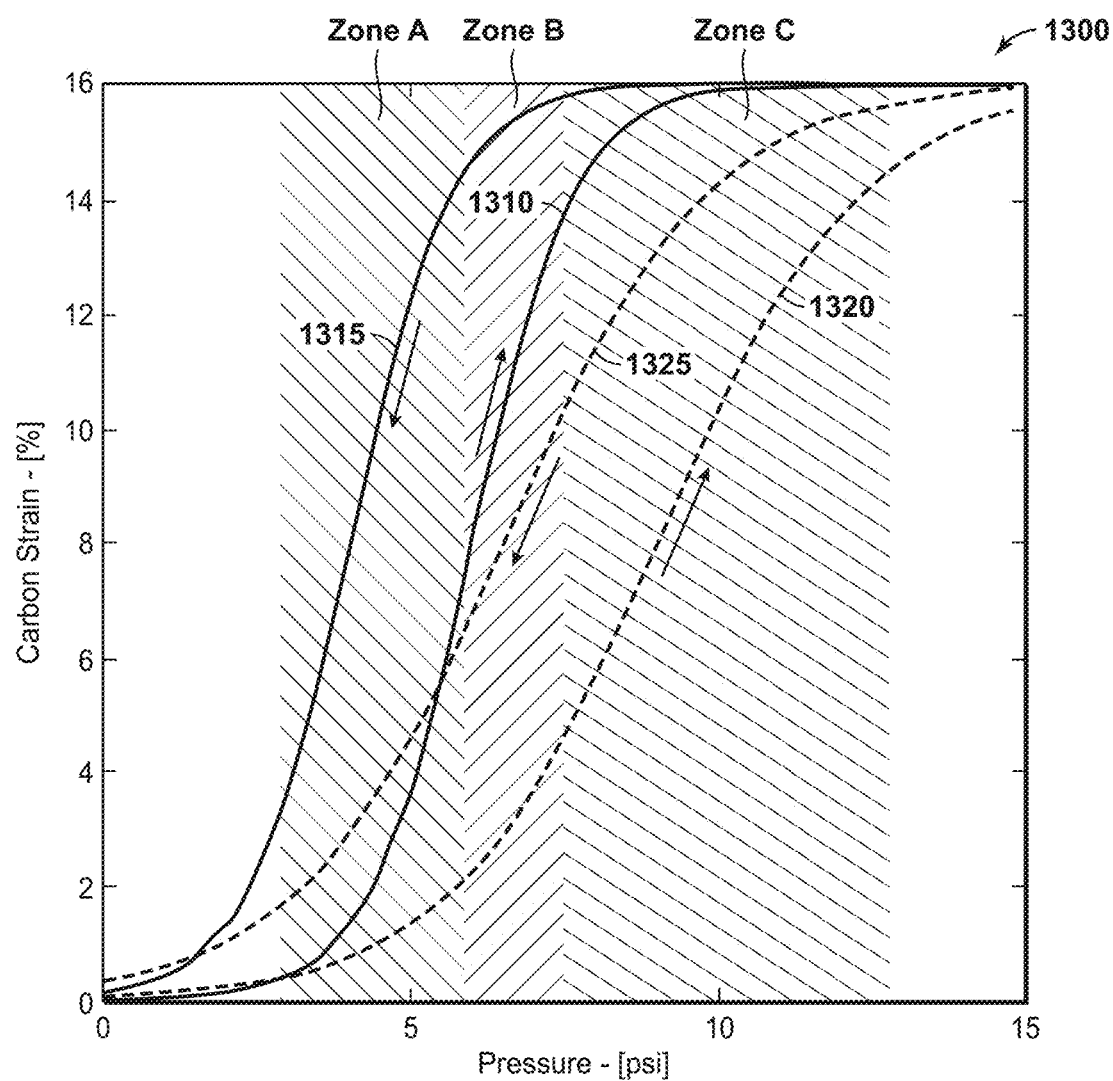
FIG. 13 is a diagram presenting a charting of strain versus pressure for carbon particles.

FIG. 13 provides a diagram 1300 showing strain versus pressure on carbon particles. Strain is shown on the y-axis and is measured in percentage, meaning percentage of compression in response to ambient conditions. Pressure is shown on the x-axis, and is indicated in units of pounds per square inch ("PSI").

Four lines are indicated in FIG. 13. The two solid lines 1310, 1315 demonstrate the compression and decompression curves of carbon particles when suspended in a fluid. Line 1310 shows a pressuring up cycle, while line 1315 shows pressuring down cycle.

The dashed lines show the envisioned compression and decompression curves of the particles when the carbon is coated in a stiff resin or embedded in a stiff rubber matrix, such as shown at polymeric rubber matrix 1105B in FIG. 11B. Line 1320 shows a compression cycle, while line 1325 shows a decompression cycle.

Shading is provided in the diagram 1300. The shading delineates the pressure ranges over which the suspended (FIG. 11A) and coated/embedded (FIG. 11B) carbon particles demonstrate the majority of their usable compressibility, respectively. The ability to extend the range over which the carbon particles compress enables performance of the particles in deeper wells, where higher hydrostatic pressures prevail.

In many well applications, it may be advantageous to shift the useable pressure range to improve particle performance under the hydrostatic pressures predicted downhole. It is proposed that the stiffness of the coating or rubber within which the particles are embedded can be chosen to achieve a preferred shift/extension of the useable pressure range. Thus, in one aspect, the elastomeric or rubber coating into which the particles are placed is engineered to allow the particles to compress over a desired pressure range.

In FIG. 13, Zone A indicates a first pressure range. Zone B indicates a second pressure range. Zone C represents still a third pressure range. It is observed that the non-coated particles exhibit a large majority of their compressibility within the lowest pressure range, to wit, Zone A. In contrast, the coated particles exhibit compressibility across all three pressure ranges, to wit, Zones A, B and C.

Carbon particles without an elastomeric coating exhibit large compressibility between 3,000 psi and 9,000 psi, but above 9,000 psi, the particles' compressibility decreases. The stiffness of the coating or rubber can be engineered to support some of the stress being enacted by the fluid pressure onto the particles. This shifts or extends the pressure range over which the carbon particles significantly compress. Thus, with the elastomeric coating the particles exhibit continued compressibility even beyond 10,000 psi.

In support of the method of designing compressible particles for a fluid mixture as described herein, the following claims may be filed with the European Patent Office or other regional patent offices.

In support of the method of placing a fluid mixture having compressible particles into a wellbore, and in support of the methods of attenuating annular pressure building as described herein, various embodiments may be provided. The present techniques may be susceptible to various modifications and alternative forms, such as the following embodiments as noted in paragraphs A1 to A20:

A1. A collection of compressible particles, wherein each of the compressible particles is designed and fabricated to collapse in response to fluid pressure within a confined wellbore volume, and wherein each of the compressible particles: defines a body fabricated from carbon; comprises a plurality of peripheral openings along the body, permitting an ingress of wellbore fluids in response to an increase in pressure within the confined wellbore volume; has a diameter that is between 100 μm and 900 μm (in dry state); and has a compressibility response of between 10% and 25%, up to 10,000 psi (or at pressures between 15 psi and at least 10,000 psi or when subjected to a hydrostatic fluid pressure between atmospheric pressure (15 psi) to 10,000 psi); and wherein the compressible particles reside at one or more selected depths within the confined wellbore volume.

A2. The collection of compressible particles of paragraph A1, wherein an average diameter of the compressible particles is between 350 μm and 450 μm.

A3. The collection of compressible particles of either of paragraphs A1 or A2, wherein: the confined volume is a trapped annulus; and each particle has a compressibility response of ≥3% at pressures up to 5,000 psi (or at pressures between 15 psi and at least 5,000 psi or when subjected to a hydrostatic fluid pressure between atmospheric pressure (15 psi) to 5,000 psi).

A4. The collection of compressible particles of any of paragraphs A1 to A3, wherein: the compressible particles are part of a blended fluid mixture wherein drilling mud is used as a carrier medium; and the drilling mud comprises a weighting agent.

A5. The collection of compressible particles of any of paragraphs A1 to A3, wherein the body of each of the compressible particles has an amorphous shape, and comprises calcined petroleum coke.

A6. The collection of compressible particles of any of paragraphs A1 to A5, wherein the compressible particles comprise: first compressible particles having a first density; and second compressible particles having a second density; and wherein the first density is greater than the second density (wherein the mean of the second density is at least 20% different from the mean of the first density).

A7. The collection of compressible particles of any of paragraphs A1 to A5, wherein the compressible particles comprise: first compressible particles having a first compressibility response; and second compressible particles having a second compressibility response; and wherein the first compressibility response is greater than the second compressibility response.

A8. The collection of compressible particles of paragraph A7, wherein: the first compressible particles reside at a first selected depth within the confined volume; the second compressible particles reside at a second selected depth within the confined volume; and wherein the first depth is greater than the second depth.

A9. The collection of compressible particles of any of paragraphs A1 to A5, wherein: the compressible particles are part of one or more packings of compressible particles residing at fixed and selected depths within the wellbore; and each of the packings is affixed to an outer diameter of a pipe joint, or is part of a pipe joint, within the wellbore.

A10. The collection of compressible particles of paragraph A9, wherein: the one or more packings comprises at least three packings; each of the at least three packings comprises an elastomeric sleeve, such that the compressible particles reside within an elastomeric sleeve; the elastomeric sleeve of each of the one or more packings has a first end and an opposing second end; and each end of the elastomeric sleeve of each of the at least three packings is secured along an outer diameter of a pipe joint in the wellbore.

A11. The collection of compressible particles of paragraph A9, wherein: each of the one or more packings comprises a matrix of compressible particles, forming a sheet; the compressible particles are held together within the matrix by means of a binder; the sheet of each of the one or more packings is at least five feet in length; and the sheet of each of the one or more packings is secured along an outer diameter of a pipe joint in the wellbore.

A12. The collection of compressible particles of paragraph A11, wherein: the sheet of each of the one or more packings is wrapped around the pipe joint at least once, and is adhered to the pipe joint by means of an adhesive material; the one or more packings comprise at least three packings, with the packings being spaced apart and dimensioned to accommodate an expected upper pressure within the wellbore; and the one or more packings comprise at least three packings, with the packings being spaced apart and dimensioned to accommodate an expected upper pressure within the wellbore.

A13. A method of attenuating annular pressure buildup within a wellbore, comprising: running a first string of casing into a wellbore, the first string of casing extending into a subsurface to a first depth; running a second string of casing into the subsurface, the second string of casing extending to a depth that is greater than the first depth, and wherein the first string of casing surrounds an upper portion of the second string of casing forming an annular region; providing one or more packings of compressible material fixed along at least one selected depth within the annular region, wherein the compressible material is designed to absorb pressure in response to thermal expansion of wellbore fluids within the annular region during the production of hydrocarbon fluids from the wellbore; placing a column of cement around the second string of casing below the first depth; and placing a wellhead over the wellbore, thereby forming a trapped annulus in the wellbore over the annular region; and wherein: the compressible material comprises a plurality of particles, with each particle defining a body fabricated from carbon, and each particle comprises a plurality of peripheral openings, permitting an ingress of wellbore fluids in response to an increase in pressure within the annular region; each particle has a diameter that is between 100 μm and 900 μm (in dry state), and has a compressibility response of between 10% and 25%, up to 10,000 psi (or at pressures between 15 psi and at least 10,000 psi or when subjected to a hydrostatic fluid pressure between atmospheric pressure (15 psi) to 10,000 psi).

A14. The method of paragraph A13, wherein: the compressible particles together have a reversible volumetric expansion/contraction of ≥3% at pressures up to 5,000 psi (or at pressures between 15 psi and at least 5,000 psi or when subjected to a hydrostatic fluid pressure between atmospheric pressure (15 psi) to 5,000 psi); and each of the one or more packings of compressible material is affixed to (i) an outer diameter of the second string of casing along the at least one selected length or (ii) an outer diameter of one or more pup joints threadedly connected to the second string of casing, in series.

A15. The method of paragraph A14, wherein: each of the one or more packings comprises a matrix of compressible particles, forming a sheet; the compressible particles are held together within the matrix by means of a binder; the sheet of each of the one or more packings is between 5 and 35 feet in length; and the method further comprises mechanically or adhesively securing the one or more packings of compressible material to an outer diameter of one or more joints along the second string of casing before the second string of casing is run into the wellbore.

A16. The method of paragraph A15, wherein: the sheet of each of the one or more packings is wrapped around the pipe joint at least once, and is adhered to the pipe joint by means of an adhesive material or a friction fit; and the one or more packings comprise at least three packings, with the packings being spaced apart and dimensioned to accommodate an expected upper pressure within the wellbore.

A17. The method of paragraph A14, wherein: each of the one or more packings comprises an elastomeric sleeve, with the compressible particles residing within an elastomeric sleeve; and the elastomeric sleeve of each of the one or more packings has a first end and an opposing second end.

A18. The method of paragraph A14, wherein each of the one or more packings comprises: an elongated rigid, porous filter threadedly connected to the second string of casing, in series; and the compressible particles are held within the porous filters.

A19. The method of paragraph A14, further comprising: placing a string of production tubing into the wellbore within the second string of casing; determining a range of pressures expected to be experienced by the fluid mixture in the trapped annulus; determining a maximum pressure for effectiveness of the compressible particles producing hydrocarbon fluids from the wellbore; and in response to thermal expansion of the fluid mixture in the trapped annulus, absorbing increased pressure using the compressible particles.

A20. The collection of compressible particles of any of paragraphs A1 to A13 or method of paragraphs A14 to A19, wherein the carbon particles are coated with a polymeric rubber material (e.g., a coating or a sleeve).

In addition to paragraphs A1 to A20. The present techniques may be susceptible to various modifications and alternative forms, such as the following embodiments as noted in paragraphs B1 to B37:

B1. A collection of compressible particles, wherein each of the compressible particles is designed and fabricated to collapse in response to fluid pressure within a confined wellbore volume, and wherein each of the compressible particles: defines a body fabricated from carbon; comprises a plurality of peripheral openings along the body, permitting an ingress of wellbore fluids in response to an increase in pressure within the confined wellbore volume; has a diameter that is between 100 micrometer (μm) and 900 μm (in dry state); and has a compressibility response of between 10% and 25%, up to 10,000 pounds per square inch (psi) (or at pressures between 15 psi and at least 10,000 psi or when subjected to a hydrostatic fluid pressure between atmospheric pressure (15 psi) to 10,000 psi); and wherein the compressible particles reside at one or more selected depths within the confined wellbore volume.

B2. The collection of compressible particles of claim B1, wherein an average diameter of the compressible particles is between 350 μm and 450 μm.

B3. The collection of compressible particles of claim B2, wherein: the confined volume is a trapped annulus; and each particle has a compressibility response of greater than or equal to (≥) 3% at pressures up to 5,000 psi (or at pressures between 15 psi and at least 5,000 psi or when subjected to a hydrostatic fluid pressure between atmospheric pressure (15 psi) to 5,000 psi).

B4. The collection of compressible particles of claim B3, wherein: the compressible particles are part of a blended fluid mixture wherein drilling mud is used as a carrier medium; and the drilling mud comprises a weighting agent.

B5. The collection of compressible particles of claim B3, wherein the body of each of the compressible particles has an amorphous shape, and comprises calcined petroleum coke.

B6. The collection of compressible particles of claim B5, wherein the compressible particles comprise: first compressible particles having a first density; and second compressible particles having a second density; and wherein the first density is greater than the second density (wherein the mean of the second density is at least 20% different from the mean of the first density).

B7. The collection of compressible particles of claim B5, wherein the compressible particles comprise: first compressible particles having a first compressibility response; and second compressible particles having a second compressibility response; and wherein the first compressibility response is greater than the second compressibility response.

B8. The collection of compressible particles of claim B7, wherein: the first compressible particles reside at a first selected depth within the confined volume; the second compressible particles reside at a second selected depth within the confined volume; and wherein the first depth is greater than the second depth.

B9. The collection of compressible particles of claim B3, wherein: the compressible particles are part of one or more packings of compressible particles residing at fixed and selected depths within the wellbore; and each of the packings is affixed to an outer diameter of a pipe joint, or is part of a pipe joint, within the wellbore.

B10. The collection of compressible particles of claim B9, wherein: the one or more packings comprises at least three packings; each of the at least three packings comprises an elastomeric sleeve, such that the compressible particles reside within an elastomeric sleeve; the elastomeric sleeve of each of the one or more packings has a first end and an opposing second end; and each end of the elastomeric sleeve of each of the at least three packings is secured along an outer diameter of a pipe joint in the wellbore.

B11. The collection of compressible particles of claim B10, wherein the elastomeric sleeve of each of the at least three packings comprises at least one opening, permitting an ingress of wellbore fluids when the elastomeric sleeve is placed within the wellbore.

B12. The collection of compressible particles of claim B9, wherein: each of the one or more packings comprises a matrix of compressible particles, forming a sheet; the compressible particles are held together within the matrix by means of a binder; the sheet of each of the one or more packings is at least five feet in length; and the sheet of each of the one or more packings is secured along an outer diameter of a pipe joint in the wellbore.

B13. The collection of compressible particles of claim B12, wherein: the sheet of each of the one or more packings is wrapped around the pipe joint at least once, and is adhered to the pipe joint by means of an adhesive material; and the one or more packings comprise at least three packings, with the packings being spaced apart and dimensioned to accommodate an expected upper pressure within the wellbore.

B14. The collection of compressible particles of claim B12, wherein: the sheet of each of the one or more packings defines a cylindrical body that is secured to the outer diameter of the pipe joint by friction fit or by an adhesive; and the one or more packings comprise at least three packings, with the packings being spaced apart and dimensioned to accommodate an expected upper pressure within the wellbore.

B15. The collection of compressible particles of claim B12, wherein the binder is rubber, hydrogenated nitrile butadiene rubber (HNBR) or a soft plastic.

B16. A method of attenuating annular pressure buildup within a wellbore, comprising: running a first string of casing into a wellbore, the first string of casing extending into a subsurface to a first depth; running a second string of casing into the subsurface, the second string of casing extending to a depth that is greater than the first depth, and wherein the first string of casing surrounds an upper portion of the second string of casing forming an annular region; providing one or more packings of compressible material fixed along at least one selected depth within the annular region, wherein the compressible material is designed to absorb pressure in response to thermal expansion of wellbore fluids within the annular region during the production of hydrocarbon fluids from the wellbore; placing a column of cement around the second string of casing below the first depth; and placing a wellhead over the wellbore, thereby forming a trapped annulus in the wellbore over the annular region; and wherein: the compressible material comprises a plurality of particles, with each particle defining a body fabricated from carbon, and each particle comprises a plurality of peripheral openings, permitting an ingress of wellbore fluids in response to an increase in pressure within the annular region; each particle has a diameter that is between 100 micrometer ($\mu$m) and 900 $\mu$m (in dry state), and has a compressibility response of between 10% and 25%, up to 10,000 pounds per square inch (psi) (or at pressures between 15 psi and at least 10,000 psi or when subjected to a hydrostatic fluid pressure between atmospheric pressure (15 psi) to 10,000 psi).

B17. The method of claim B16, wherein: the compressible particles together have a reversible volumetric expansion/contraction of greater than or equal to ($\geq$) 3% at pressures up to 5,000 psi (or at pressures between 15 psi and at least 5,000 psi or when subjected to a hydrostatic fluid pressure between atmospheric pressure (15 psi) to 5,000 psi); and each of the one or more packings of compressible material is affixed to (i) an outer diameter of the second string of casing along the at least one selected length or (ii) an outer diameter of one or more pup joints threadedly connected to the second string of casing, in series.

B18. The method of claim B17, wherein: each of the one or more packings comprises a matrix of compressible particles, forming a sheet; the compressible particles are held together within the matrix by means of a binder; and the sheet of each of the one or more packings is at least five feet in length.

B19. The method of claim B18, wherein: the sheet of each of the one or more packings is between 5 and 35 feet in length; and the method further comprises mechanically or adhesively securing the one or more packings of compressible material to an outer diameter of one or more joints along the second string of casing before the second string of casing is run into the wellbore.

B20. The method of claim B19, wherein: the sheet of each of the one or more packings is wrapped around the pipe joint at least once, and is adhered to the pipe joint by means of an adhesive material; and the one or more packings comprise at least three packings, with the packings being spaced apart and dimensioned to accommodate an expected upper pressure within the wellbore.

B21. The method of claim B19, wherein: the sheet of each of the one or more packings defines a cylindrical body that is secured to the outer diameter of the pipe joint by friction fit or by an adhesive; and the one or more packings comprise at least three packings, with the packings being spaced apart and dimensioned to accommodate an expected upper pressure within the wellbore.

B22. The method of claim B19, wherein the binder is rubber, hydrogenated nitrile butadiene rubber (HNBR) or a soft plastic.

B23. The method of claim B17, wherein: each of the one or more packings comprises an elastomeric sleeve, with the compressible particles residing within an elastomeric sleeve; and the elastomeric sleeve of each of the one or more packings has a first end and an opposing second end.

B24. The method of claim B23, wherein: the elastomeric sleeve of each of the one or more packings is secured to a respective joint of the second string of casing by means of upper and lower collars, respectively; and the one or more packings comprise at least three packings, with the packings being spaced apart and dimensioned to accommodate an expected upper pressure within the wellbore.

B25. The method of claim B16, wherein each of the one or more packings comprises: an elongated rigid, porous filter threadedly connected to the second string of casing, in series; and the compressible particles are held within the porous filters.

B26. The method of claim B25, wherein the porous filter of each of the one or more packings comprises a sand screen or a slotted tubular joint, and is fabricated from metal or ceramic.

B27. The method of claim B16, further comprising: placing a string of production tubing into the wellbore within the second string of casing; producing hydrocarbon fluids from the wellbore; and in response to thermal expansion of the fluid mixture in the trapped annulus, absorbing increased pressure using the compressible particles.

B28. The method of claim B16, further comprising: determining a range of pressures expected to be experienced by the fluid mixture in the trapped annulus; and determining a maximum pressure for effectiveness of the compressible particles.

B29. The method of claim B28, further comprising: designing the compressible particles to have an optimum pressure performance at an upper end of the range of expected pressures.

B30. A packing of compressible material, comprising: an elongated sheet of compressible particles held together by means of a binder to form a fixed matrix, wherein the matrix is inert to hydrocarbon fluids within a wellbore; and wherein: the compressible particles together have a reversible volumetric expansion/contraction of greater than or equal to ($\geq$) 10% at pressures up to 10,000 pounds per square inch (psi) (or at pressures between 15 psi and at least 10,000 psi or when subjected to a hydrostatic fluid pressure between atmospheric pressure (15 psi) to 10,000 psi), the sheet is between five and 35 feet in length, the sheet is dimensioned to be secured around the outer diameter of a pipe joint, and each of the compressible particles comprises a plurality of peripheral openings, permitting an ingress of wellbore fluids in response to an increase in pressure within the annular region.

B31. The packing of compressible particles of claim B30, wherein the compressible particles have outer diameters that are between 100 micrometer ($\mu$m) and 900 $\mu$m (in dry state).

B32. The packing of compressible particles of claim B31, wherein each of the compressible particles has an amorphous shape and comprises calcined petroleum coke.

B33. A method of attenuating annular pressure buildup within a wellbore, comprising: running a first string of casing into a wellbore, the first string of casing extending into a subsurface to a first depth; running a second string of casing into the subsurface, the second string of casing extending to a depth that is greater than the first depth, and wherein the first string of casing surrounds an upper portion of the second string of casing forming an annular region; providing a plurality of packings of compressible material fixed at selected depths within the annular region, wherein: each packing of compressible material is affixed to an outer diameter of a pipe joint along the second string of casing, or is threadedly placed in series with the second string of casing, the compressible material comprises a plurality of carbonaceous particles comprising calcined petroleum coke, and each of the compressible particles comprises a plurality of peripheral openings, permitting an ingress of wellbore fluids in response to an increase in pressure within the confined wellbore volume due to thermal expansion during the production of hydrocarbon fluids from the wellbore; placing a column of cement around the second string of casing below the first depth; and placing a wellhead over the wellbore, thereby forming a trapped annulus in the wellbore over the annular region.

B34. The method of claim B33, further comprising: determining an expected range of pressures within the trapped annulus; and selecting the carbonaceous particles to have an optimum pressure performance at an upper end of the expected range of pressures; and wherein the plurality of compressible particles together have a reversible volumetric expansion/contraction of greater than or equal to ($\geq$) 3% at pressures up to 5,000 pounds per square inch (psi) (or at pressures between 15 psi and at least 5,000 psi or when subjected to a hydrostatic fluid pressure between atmospheric pressure (15 psi) to 5,000 psi).

B35. The method of claim B34, wherein: each of the one or more packings comprises an elongated, rigid porous filter at the one or more selected depths, and threadedly connected to the second string of casing, in series; and the plurality of particles reside within respective filters.

B36. The method of claim B34, wherein: each of the one or more packings comprises a matrix of compressible particles held together by means of a binder, forming a sheet; each sheet is at least five feet in length; and each sheet is secured along an outer diameter of a pipe joint along the second string of casing at the selected depths.

B37. The method of claim B33, wherein: the one or more packings comprise at least three packings, with the packings being spaced apart and dimensioned to accommodate an expected upper pressure within the wellbore during production.

Further variations of the method of designing compressible particles within a trapped annulus herein may fall within the spirit of the claims, below. It will be appreciated that the inventions are susceptible to modification, variation and change without departing from the spirit thereof.

We claim:

1. A packing of compressible material, comprising:
   an elongated sheet of compressible particles held together by means of a binder to form a fixed matrix, wherein the matrix is inert to hydrocarbon fluids within a wellbore;
   wherein:
      the compressible particles together have a reversible volumetric expansion/contraction of greater than or equal to ($\geq$) 10% at pressure changes between 15 pounds per square inch (psi) and up to 10,000 psi, the sheet is between 5 feet and 35 feet in length,
the sheet is dimensioned to be secured around an outer diameter of a pipe joint, and
each of the compressible particles comprises a plurality of peripheral openings, permitting an ingress of wellbore fluids in response to an increase in pressure within the wellbore.

2. The packing of compressible particles of claim 1, wherein the compressible particles have outer diameters that are between 40 micrometer (μm) and 1300 μm (in dry state).

3. The packing of compressible particles of claim 1, wherein each of the compressible particles has an amorphous shape and comprises calcined petroleum coke.

4. A collection of compressible particles, wherein each of the compressible particles is designed and fabricated to collapse in response to fluid pressure within a confined wellbore volume, and wherein each of the compressible particles:
defines a body fabricated from carbon;
comprises a plurality of peripheral openings along the body, permitting an ingress of wellbore fluids in response to an increase in pressure within the confined wellbore volume;
has a diameter that is between 100 micrometer (μm) and 900 μm (in dry state); and
has a compressibility response of between 10% and 25%, for pressure changes between 15 pounds per square inch (psi) and up to 10,000 psi;
wherein the compressible particles reside at one or more selected depths within the confined wellbore volume.

5. The collection of compressible particles of claim 4, wherein:
the confined volume is a trapped annulus; and
each particle has a compressibility response of greater than or equal to (≥) 3% at pressures changes between 15 psi and up to 5,000 psi.

6. The collection of compressible particles of claim 5, wherein the body of each of the compressible particles has an amorphous shape, and comprises calcined petroleum coke.

7. The collection of compressible particles of claim 6, wherein the compressible particles comprise:
first compressible particles having a first density; and
second compressible particles having a second density;
wherein the first density is greater than the second density.

8. The collection of compressible particles of claim 6, wherein the compressible particles comprise:
first compressible particles having a first compressibility response; and
second compressible particles having a second compressibility response;
wherein the first compressibility response is greater than the second compressibility response.

9. The collection of compressible particles of claim 8, wherein:
the first compressible particles reside at a first selected depth within the confined volume; and
the second compressible particles reside at a second selected depth within the confined volume;
wherein the first depth is greater than the second depth.

10. The collection of compressible particles of claim 5, wherein:
the compressible particles are part of one or more packings of compressible particles residing at fixed and selected depths within the wellbore; and
each of the packings is affixed to an outer diameter of a pipe joint, or is part of the pipe joint, within the wellbore.

11. The collection of compressible particles of claim 10, wherein:
the one or more packings comprises at least three packings;
each of the at least three packings comprises an elastomeric sleeve, such that the compressible particles reside within the elastomeric sleeve;
the elastomeric sleeve of each of the one or more packings has a first end and an opposing second end; and
each end of the elastomeric sleeve of each of the at least three packings is secured along an outer diameter of the pipe joint in the wellbore.

12. The collection of compressible particles of claim 11, wherein the elastomeric sleeve of each of the at least three packings comprises at least one opening, permitting an ingress of wellbore fluids when the elastomeric sleeve is placed within the wellbore.

13. The collection of compressible particles of claim 10, wherein:
each of the one or more packings comprises a matrix of compressible particles, forming a sheet;
the compressible particles are held together within the matrix by means of a binder;
the sheet of each of the one or more packings is at least five feet in length; and
the sheet of each of the one or more packings is secured along an outer diameter of the pipe joint in the wellbore.

14. The collection of compressible particles of claim 13, wherein:
the sheet of each of the one or more packings is wrapped around the pipe joint at least once, and is adhered to the pipe joint by means of an adhesive material; and
the one or more packings comprise at least three packings, with the packings being spaced apart and dimensioned to accommodate an expected upper pressure within the wellbore.

15. The collection of compressible particles of claim 13, wherein:
the sheet of each of the one or more packings defines a cylindrical body that is secured to the outer diameter of the pipe joint by friction fit or by an adhesive; and
the one or more packings comprise at least three packings, with the packings being spaced apart and dimensioned to accommodate an expected upper pressure within the wellbore.

16. The collection of compressible particles of claim 13, wherein the binder is rubber, hydrogenated nitrile butadiene rubber (HNBR), nitrile butadiene rubber (NBR), or fluoroelastomer (such as FKM) or a soft plastic.

17. A method of attenuating annular pressure buildup within a wellbore, comprising:
running a first string of casing into a wellbore, the first string of casing extending into a subsurface to a first depth;
running a second string of casing into the subsurface, the second string of casing extending to a depth that is greater than the first depth, and wherein the first string of casing surrounds an upper portion of the second string of casing forming an annular region;
providing one or more packings of compressible material fixed along at least one selected depth within the annular region, wherein the compressible material is designed to absorb pressure in response to thermal expansion of wellbore fluids within the annular region during production of hydrocarbon fluids from the wellbore;

placing a column of cement around the second string of casing below the first depth; and placing a wellhead over the wellbore, thereby forming a trapped annulus in the wellbore over the annular region;

wherein:
the compressible material comprises a plurality of particles, with each particle defining a body fabricated from carbon, and each particle comprises a plurality of peripheral openings, permitting an ingress of wellbore fluids in response to an increase in pressure within the annular region; and each particle has a diameter that is between 100 micrometer (µm) and 900 µm (in dry state), and has a compressibility response of between 10% and 25%, for pressures between 15 pounds per square inch (psi) and up to 10,000 psi.

18. The method of claim 17, wherein:
the compressible particles together have a reversible volumetric expansion/contraction of greater than or equal to (≥) 3% at pressures between 15 psi and up to 5,000 psi; and each of the one or more packings of compressible material is affixed to (i) an outer diameter of the second string of casing along the at least one selected length or (ii) an outer diameter of one or more pup joints threadedly connected to the second string of casing, in series.

19. The method of claim 18, wherein:
each of the one or more packings comprises a matrix of compressible particles, forming a sheet;

the compressible particles are held together within the matrix by means of a binder; and the sheet of each of the one or more packings is at least five feet in length.

20. The method of claim 19, wherein:
the sheet of each of the one or more packings is between 5 and 35 feet in length; and the method further comprises mechanically or adhesively securing the one or more packings of compressible material to an outer diameter of one or more joints along the second string of casing before the second string of casing is run into the wellbore.

21. The method of claim 20, wherein:
the sheet of each of the one or more packings is wrapped around the pipe joint at least once, and is adhered to the pipe joint by means of an adhesive material; and the one or more packings comprise at least three packings, with the packings being spaced apart and dimensioned to accommodate an expected upper pressure within the wellbore.

22. The method of claim 17, further comprising:
placing a string of production tubing into the wellbore within the second string of casing;

producing hydrocarbon fluids from the wellbore; and in response to thermal expansion of wellbore fluids in the trapped annulus, absorbing increased pressure using the compressible particles.

23. The method of claim 17, further comprising:
determining a range of pressures expected to be experienced by wellbore fluids in the trapped annulus; and determining a maximum pressure for effectiveness of the compressible particles.

24. The method of claim 23, further comprising:
designing the compressible particles to have an optimum pressure performance at an upper end of the range of expected pressures.

25. A method of attenuating annular pressure buildup within a wellbore, comprising:
running a first string of casing into a wellbore, the first string of casing extending into a subsurface to a first depth;

running a second string of casing into the subsurface, the second string of casing extending to a depth that is greater than the first depth, and wherein the first string of casing surrounds an upper portion of the second string of casing forming an annular region;

providing a plurality of packings of compressible material fixed at selected depths within the annular region, wherein:
each packing of compressible material is affixed to an outer diameter of a pipe joint along the second string of casing, or is threadedly placed in series with the second string of casing, the compressible material comprises a plurality of carbonaceous particles comprising calcined petroleum coke, and each of the compressible particles comprises a plurality of peripheral openings, permitting an ingress of wellbore fluids in response to an increase in pressure within the wellbore due to thermal expansion during production of hydrocarbon fluids from the wellbore;

placing a column of cement around the second string of casing below the first depth; and placing a wellhead over the wellbore, thereby forming a trapped annulus in the wellbore over the annular region.

26. The method of claim 25, further comprising:
determining an expected range of pressures within the trapped annulus; and selecting the carbonaceous particles to have an optimum pressure performance at an upper end of the expected range of pressures;

wherein the plurality of compressible particles together have a reversible volumetric expansion/contraction of greater than or equal to (≥) 3% at pressure changes from 15 pounds per square inch (psi) up to 5,000 psi.

* * * * *